(12) United States Patent
Martheenal

(10) Patent No.: US 8,205,492 B2
(45) Date of Patent: Jun. 26, 2012

(54) PRECIPITATION COLLECTOR

(75) Inventor: Basil Thompson Martheenal, Brampton (CA)

(73) Assignee: Enviro World Corporation, Toronto (CA)

( * ) Notice: Subject to any disclaimer, the term of this patent is extended or adjusted under 35 U.S.C. 154(b) by 36 days.

(21) Appl. No.: 12/850,402

(22) Filed: Aug. 4, 2010

(65) Prior Publication Data
US 2012/0031782 A1 Feb. 9, 2012

(30) Foreign Application Priority Data
Jul. 15, 2010 (CA) .................................... 2710697

(51) Int. Cl.
*G01W 1/00* (2006.01)
(52) U.S. Cl. ................................................. 73/170.17
(58) Field of Classification Search ......................... None
See application file for complete search history.

(56) References Cited

U.S. PATENT DOCUMENTS

| | | | |
|---|---|---|---|
| 3,442,385 A | | 5/1969 | Nash |
| 3,705,533 A | * | 12/1972 | Kahl et al. ................. 73/170.23 |
| 4,127,453 A | * | 11/1978 | Radebold ..................... 205/339 |
| 5,226,558 A | | 7/1993 | Whitney et al. |
| 5,413,003 A | * | 5/1995 | Waite et al. ................ 73/170.18 |
| 5,564,599 A | | 10/1996 | Barber et al. |
| 5,571,963 A | * | 11/1996 | Balchin et al. ............. 73/170.21 |
| D422,127 S | | 3/2000 | Jacques et al. |
| 6,038,920 A | * | 3/2000 | Gilbert et al. ............. 73/170.23 |
| 6,401,530 B1 | * | 6/2002 | Roman ...................... 73/170.21 |
| D486,950 S | | 2/2004 | Ruck |
| 6,742,557 B1 | | 6/2004 | Backe |
| D518,270 S | | 3/2006 | Ayres |
| 7,066,021 B1 | * | 6/2006 | Noe ........................... 73/170.17 |
| 7,181,961 B1 | * | 2/2007 | Hill ............................ 73/170.17 |
| 7,249,502 B2 | * | 7/2007 | Luukkala et al. .......... 73/170.17 |
| 7,401,508 B1 | * | 7/2008 | Peterson .................... 73/170.17 |
| 7,536,907 B1 | * | 5/2009 | Peterson .................... 73/170.22 |
| D596,372 S | | 7/2009 | Lawrence |
| D599,975 S | | 9/2009 | Magee |
| D603,575 S | | 11/2009 | Kerman et al. |
| D605,375 S | | 12/2009 | Anderson et al. |
| D615,273 S | | 5/2010 | Magee |
| D628,762 S | | 12/2010 | Fischer et al. |
| 8,054,187 B2 | * | 11/2011 | Dufaux et al. ................ 340/602 |
| 2006/0191333 A1 | * | 8/2006 | Noe ........................... 73/170.17 |
| 2008/0223126 A1 | * | 9/2008 | Geschwender ............ 73/170.17 |

OTHER PUBLICATIONS

Notice of Allowance issued Feb. 16, 2011, by the U.S. Patent and Trademark Office in related U.S. Appl. No. 29/368,670 (10 pages).

* cited by examiner

*Primary Examiner* — Andre Allen
(74) *Attorney, Agent, or Firm* — Osha Liang, LLP

(57) ABSTRACT

A precipitation collector includes a container having a container space for containing precipitation received through a container opening. The container includes a discharge outlet fluidly coupled to a valve to define selectively operable outlet of the collector for selectively discharging the received precipitation. A lid partially covering the container opening and includes a lid passage which defines a collector inlet disposed in fluid communication with the container space through the container opening such that the lid passage provides a passage for entry of environmental precipitation into the container space. The container includes an overflow outlet configured for discharging an overflow of the received precipitation collected within the container space.

20 Claims, 38 Drawing Sheets

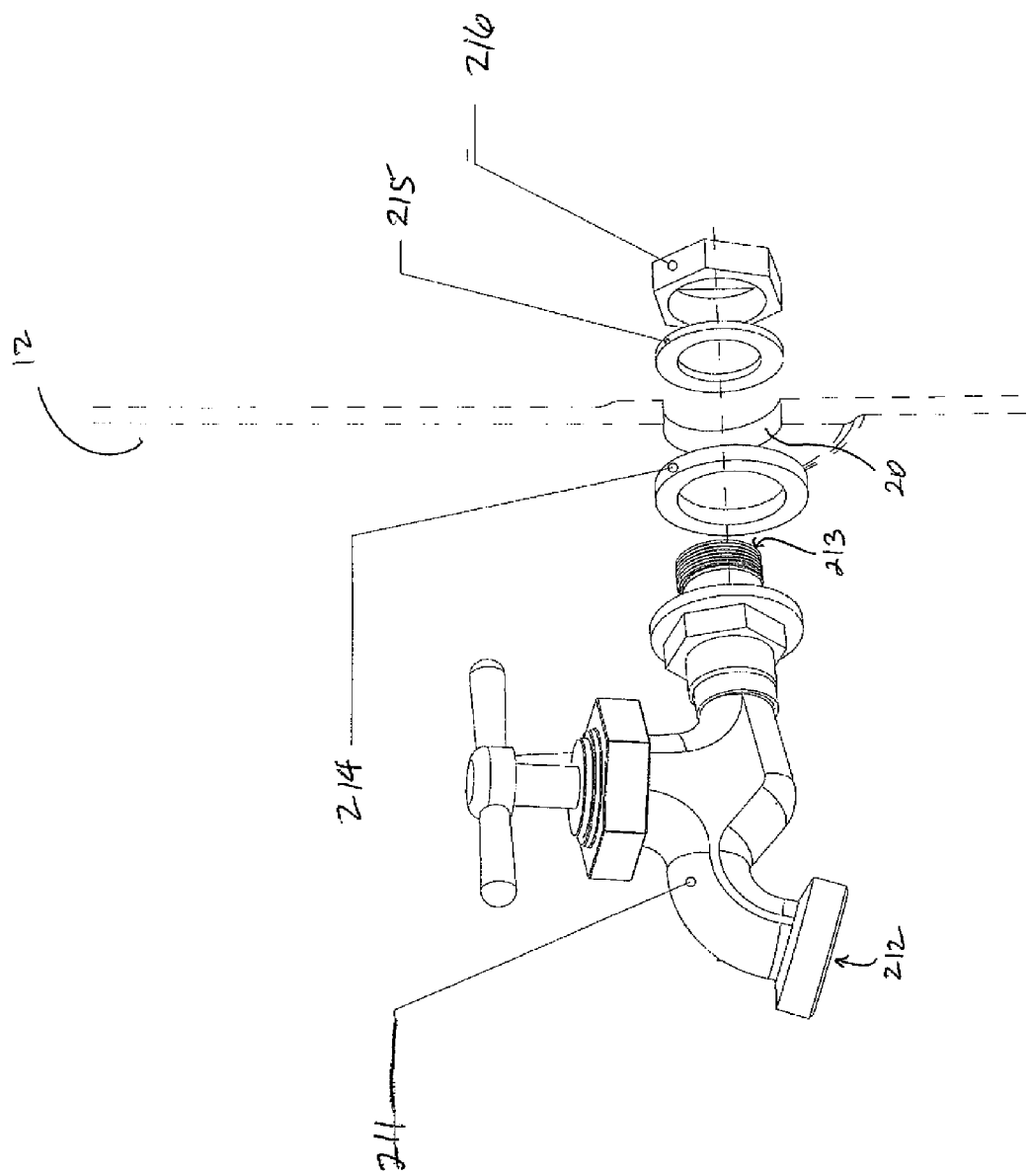

PRECIPITATION COLLECTOR

FIELD OF THE INVENTION

This relates to precipitation collectors and kits for assembling such devices.

BACKGROUND

Household use of precipitation collectors is becoming more widespread as water conservation awareness increases. A precipitation collector collects environmentally-derived precipitation and provides for storage of the collected precipitation until such time as it is desirable to use the collected precipitation for household purposes (eg. watering plants). Precipitation collectors should be ergonomically designed so as to facilitate their usage.

SUMMARY

In one aspect, there is provided a precipitation collector, comprising:
a container including a container space configured for containing precipitation received through a container opening, wherein the container includes a discharge outlet fluidly coupled to a valve to define selectively operable outlet of the collector for selectively discharging the received precipitation which has been collected within the container space; and
a lid partially covering the container opening, wherein the lid includes a lid passage which defines a collector inlet disposed in fluid communication with the container space through the container opening such that the lid passage provides a passage for entry of environmental precipitation into the container space;
wherein the container includes an overflow outlet configured for discharging an overflow of the received precipitation collected within the container space, wherein an edge of the perimeter of the overflow outlet, disposed furthest from a reference vertical plane tangent to an operative outermost external surface portion of the collector, is disposed at a minimum distance of less than six (6) inches from the reference vertical plane when the operative outermost external surface portion is positioned adjacent to the reference vertical plane when the collector is supported on a horizontal reaction surface;
and wherein the operative outermost external surface portion is disposed on an operative external surface portion of the collector, and wherein the operative external surface portion of the collector is that portion of the external surface which is opposite from the external surface portion at which the selectively operable discharge outlet is disposed, and wherein the operative outermost external surface portion is a portion of the operative external surface portion which extends furthest outwardly relative to other portions of the operative external surface portion when the collector is supported on a horizontal reaction surface.

In another aspect, there is provided a precipitation collector, comprising:
a container including a container space configured for containing precipitation received through a container opening; wherein the container includes a discharge outlet fluidly coupled to a valve to define a selectively operable outlet of the collector for selectively discharging the received precipitation which has been collected within the container space; and
a lid partially covering the container opening, wherein the lid includes a lid passage which defines a collector inlet disposed in fluid communication with the container space through the container opening such that the lid passage provides a passage for entry of environmental precipitation into the container space;
wherein the container includes an overflow outlet configured for discharging an overflow of the received precipitation collected within the container space, wherein an edge of the perimeter of the overflow outlet, disposed furthest from an operative planar vertical surface, is disposed at a minimum distance of less than six (6) inches from the operative planar vertical surface when a position-operative external surface portion of the collector is positioned adjacent to the operative planar vertical surface when the collector is supported on a horizontal reaction surface;
and wherein the position-operative external surface portion is a portion of the external surface of the collector which is opposite from the external surface portion at which the discharge outlet is disposed.

In a further aspect, there is provided a kit for assembly of a precipitation collector, comprising:
a container including a container space configured for containing precipitation received through a container opening, wherein the container includes a discharge outlet;
wherein either:
(a.1) a selectively operable outlet for selectively discharging precipitation which has been received within the container space is defined by a valve fluidly coupled to the discharge outlet;
or
(a.2) a valve is provided and configured for fluid coupling to the container to thereby co-operate with the discharge outlet such that the valve is operable to effect selective discharge, through the discharge outlet, of received precipitation which has been collected within the container space; and
a lid including a lid passage which defines a collector inlet, wherein the lid is either:
(a) coupled to the container and partially covering the container opening, and the collector inlet is disposed in fluid communication with the container space through the container opening such that the lid passage provides a passage for entry of environmental precipitation into the container space; or
(b) positionable relative to the container to an operative position for partially covering the container opening, wherein the collector inlet is disposed in fluid communication with the container space through the container opening when the lid is disposed in the operative position such that the lid passage provides a passage for entry of environmental precipitation into the container space;
wherein the container includes an overflow outlet, or an outlet-creating portion configured for separation from the container to effect fluid communication between the container space and an overflow outlet, wherein the overflow outlet is configured for discharging an overflow of the received precipitation which has been collected within the container space, wherein an edge of the perimeter of the overflow outlet, disposed furthest from a reference vertical plane tangent to an operative outermost external surface portion of the collector, is disposed at a minimum distance of less than six (6) inches from the reference vertical plane when the operative outermost external surface portion is positioned adjacent to the reference vertical plane when the collector is supported on a horizontal reaction surface;

and wherein the operative outermost external surface portion is disposed on an operative external surface portion of the collector, and wherein the operative external surface portion of the collector is that portion of the external surface which is opposite from the external surface portion at which the discharge outlet is disposed, and wherein the operative outermost external surface portion is a portion of the operative external surface portion which extends furthest outwardly relative to other portions of the operative external surface portion when the collector is supported on a horizontal reaction surface.

In yet another aspect, there is provided a kit for assembly of a precipitation collector, comprising:

a container including a container space configured for containing precipitation received through a container opening, wherein the container includes a discharge outlet;

wherein either:
 (a.1) a selectively operable outlet for selectively discharging precipitation which has been received within the container space is defined by a valve fluidly coupled to the discharge outlet;
 or
 (a.2) a valve is provided and configured for fluid coupling to the container to thereby co-operate with the discharge outlet such that the valve is operable to effect selective discharge, through the discharge outlet, of received precipitation which has been collected within the container space; and a lid including a lid passage which defines a collector inlet, wherein the lid is either:
 (a) coupled to the container and partially covering the container opening, and the collector inlet is disposed in fluid communication with the container space through the container opening such that the lid passage provides a passage for entry of environmental precipitation into the container space; or
 (b) positionable relative to the container to an operative position for partially covering the container opening, wherein the collector inlet is disposed in fluid communication with the container space through the container opening when the lid is disposed in the operative position such that the lid passage provides a passage for entry of environmental precipitation into the container space;

wherein the container includes an overflow outlet, or an outlet-creating portion configured for separation from the container to effect fluid communication between the container space and an overflow outlet, wherein the overflow outlet is configured for discharging an overflow of the received precipitation which has been collected within the container space, wherein an edge of the perimeter of the overflow outlet, disposed furthest from an operative planar vertical surface, is disposed at a minimum distance of less than six (6) inches from the operative planar vertical surface when a position-operative external surface portion of the collector is positioned adjacent to the operative planar vertical surface when the collector is supported on a horizontal reaction surface;

and wherein the position-operative external surface portion is a portion of the external surface of the collector which is opposite from the external surface portion at which the discharge outlet is disposed.

In a further aspect, there is provided a kit for assembly of a precipitation collector device, comprising:

a container including a container space configured for containing precipitation received through a container opening, wherein the container includes a discharge outlet, and wherein the container includes an overflow outlet, or an outlet-creating portion configured for separation from the container to effect fluid communication between the container space and an overflow outlet, wherein the overflow outlet is configured for discharging an overflow of the received precipitation which has been collected within the container space, wherein either:
 (a.1) a selectively operable outlet for selectively discharging precipitation which has been received within the container space is defined by a valve fluidly coupled to the discharge outlet;
 or
 (a.2) a valve is provided and configured for fluid coupling to the container to thereby co-operate with the discharge outlet such that the valve is operable to effect selective discharge, through the discharge outlet, of received precipitation which has been collected within the container space;

a lid including a lid passage which defines a collector inlet, wherein the lid is either:
 (b.1) coupled to the container and partially covering the container opening, and the collector inlet is disposed in fluid communication with the container space through the container opening such that the lid passage provides a passage for entry of environmental precipitation into the container space; or
 (b.2) positionable relative to the container to an operative position for partially covering the container opening, wherein the collector inlet is disposed in fluid communication with the container space through the container opening when the lid is disposed in the operative position such that the lid passage provides a passage for entry of environmental precipitation into the container space;

a flexible conduit coupled to, or configured for fluid coupling to, the overflow outlet; and instructions for effecting connection of a clamp to a wall, fluid coupling of the flexible conduit to the overflow outlet, and co-operation between the clamp and the flexible conduit so as to effect coupling of the flexible conduit to the wall.

In yet a further aspect, there is provided a precipitation collector, comprising:

a container including a container space, wherein the container space includes a precipitation containment compartment space provided in a precipitation containment compartment and an overflow containment compartment space provided in an overflow containment compartment, wherein the precipitation containment compartment is configured to receive precipitation through a container opening, and wherein the overflow containment compartment space is configured for receiving an overflow of precipitation from the precipitation containment compartment, and wherein the container includes a selectively operable outlet for selectively discharging precipitation which has been collected within the precipitation containment compartment;

a lid partially covering the container opening, wherein the lid includes a lid passage which defines a collector inlet disposed in fluid communication with the container space through the container opening such that the lid passage provides a passage for entry of environmental precipitation into the container space;

wherein the container includes an overflow fluid passage disposed in fluid communication with the overflow containment compartment space for effecting discharge of precipitation collected within the overflow containment compartment space through an outlet.

In yet another aspect, there is provided a kit for assembling a precipitation collector, comprising:

a container including a container space, wherein the container space includes a precipitation containment compartment space provided in a precipitation containment compartment and an overflow compartment space provided in an overflow containment compartment, wherein the precipitation containment compartment is configured to receive precipitation through a container opening, and wherein the overflow containment compartment space is configured for receiving an overflow of precipitation from the precipitation containment compartment, wherein the container includes a discharge outlet, and wherein the container includes an overflow outlet, or an outlet-creating portion configured for separation from the container to effect fluid communication between the container space and an overflow outlet, wherein the overflow outlet is configured for discharging an overflow of the received precipitation which has been collected within the container space, wherein either:

(a.1) a selectively operable outlet for selectively discharging precipitation which has been received within the precipitation containment compartment space and is defined by a valve fluidly coupled to the discharge outlet;

or (a.2) a valve is provided and configured for fluid coupling to the container to thereby co-operate with the discharge outlet such that the valve is operable to effect selective discharge, through the discharge outlet, of received precipitation which has been collected within the precipitation containment compartment space;

a lid including a lid passage which defines a collector inlet, wherein the lid is either:

(b.1) coupled to the container and partially covering the container opening, and the collector inlet is disposed in fluid communication with the container space through the container opening such that the lid passage provides a passage for entry of environmental precipitation into the container space; or (b.2) positionable relative to the container to an operative position for partially covering the container opening, wherein the collector inlet is disposed in fluid communication with the container space through the container opening when the lid is disposed in the operative position such that the lid passage provides a passage for entry of environmental precipitation into the container space.

BRIEF DESCRIPTION OF THE DRAWINGS

The embodiments disclosed herein will now be described in further detail with reference to the following figures:

FIG. 38 is an exploded view of the components illustrated in FIG. 37.

DETAILED DESCRIPTION

Referring to FIGS. 1 to 15, there is provided a precipitation collector 10. Referring to FIGS. 16 to 38, there is also provided a kit for assembling a precipitation collector 10.

A. Precipitation Collector

The precipitation collector 10 is provided for receiving and collecting all forms of environmental precipitation which are capable of entering the precipitation collector 10 through a lid passage 38 (described below), such as rain, sleet and snow.

The precipitation collector 10 includes a container 12 and a lid 14.

Figure 1:
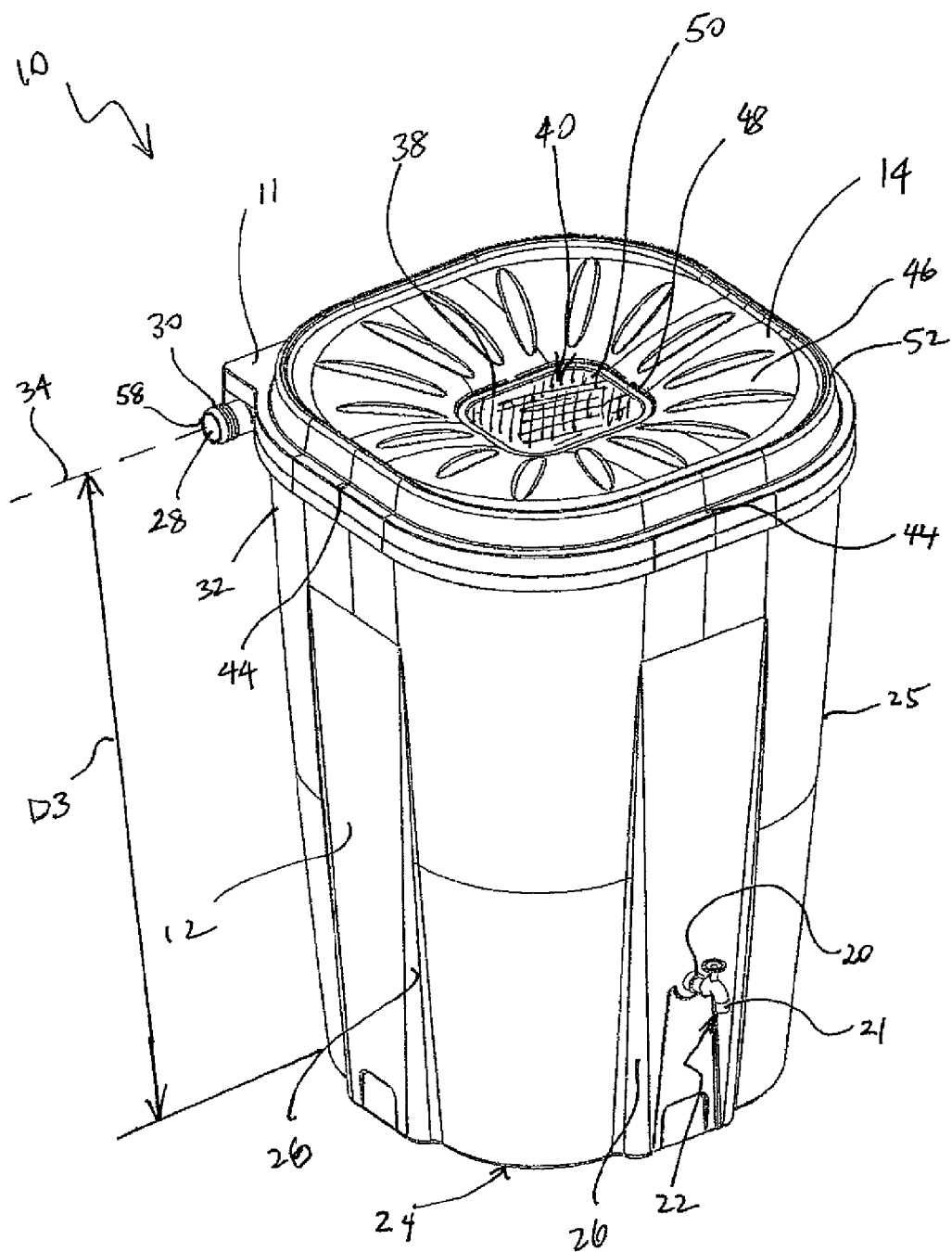
FIG. 1 is a top perspective view of an embodiment of a precipitation collector.
Figure 2:
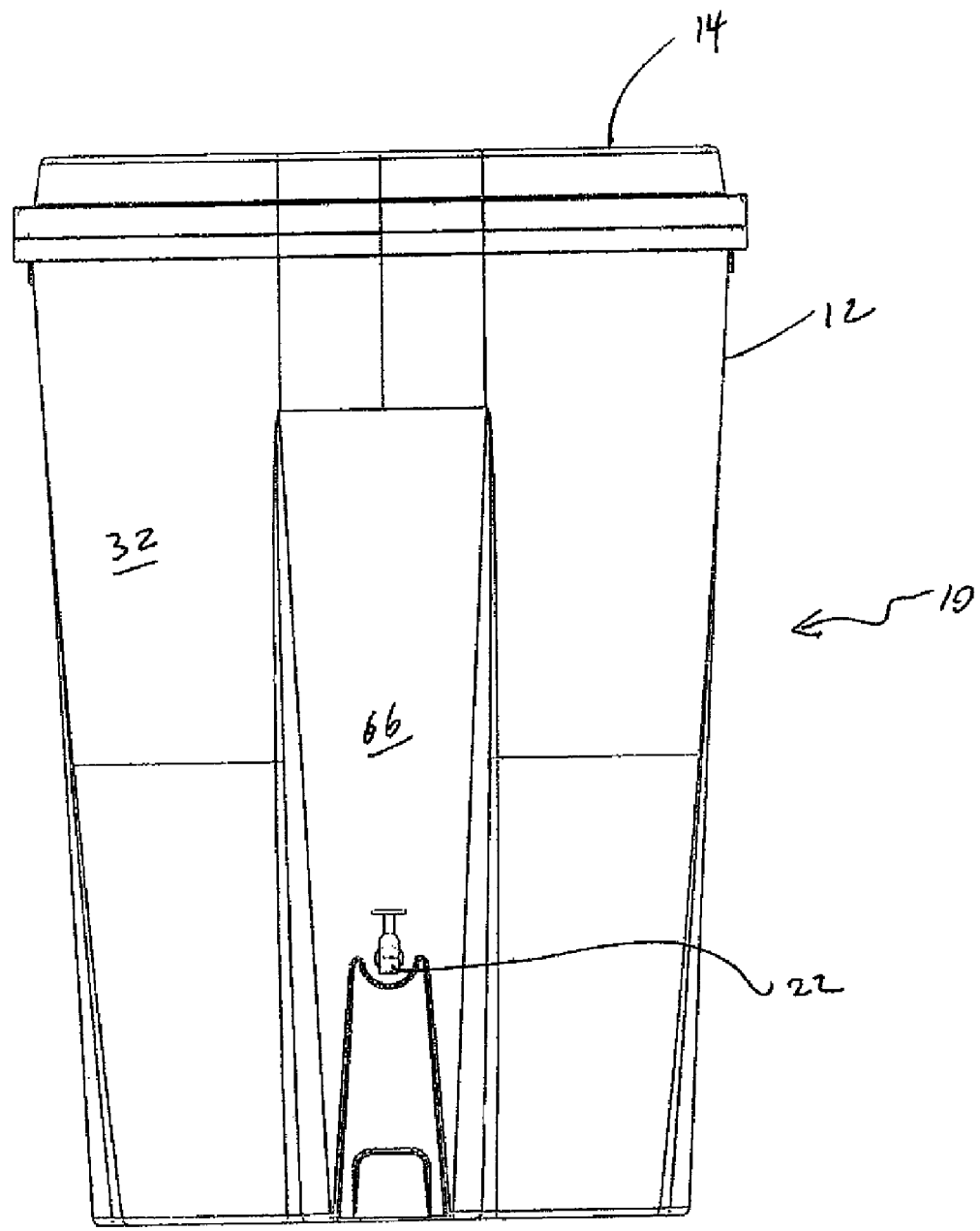
FIG. 2 is a front elevation view of the precipitation collector of FIG. 1.
Figure 3:
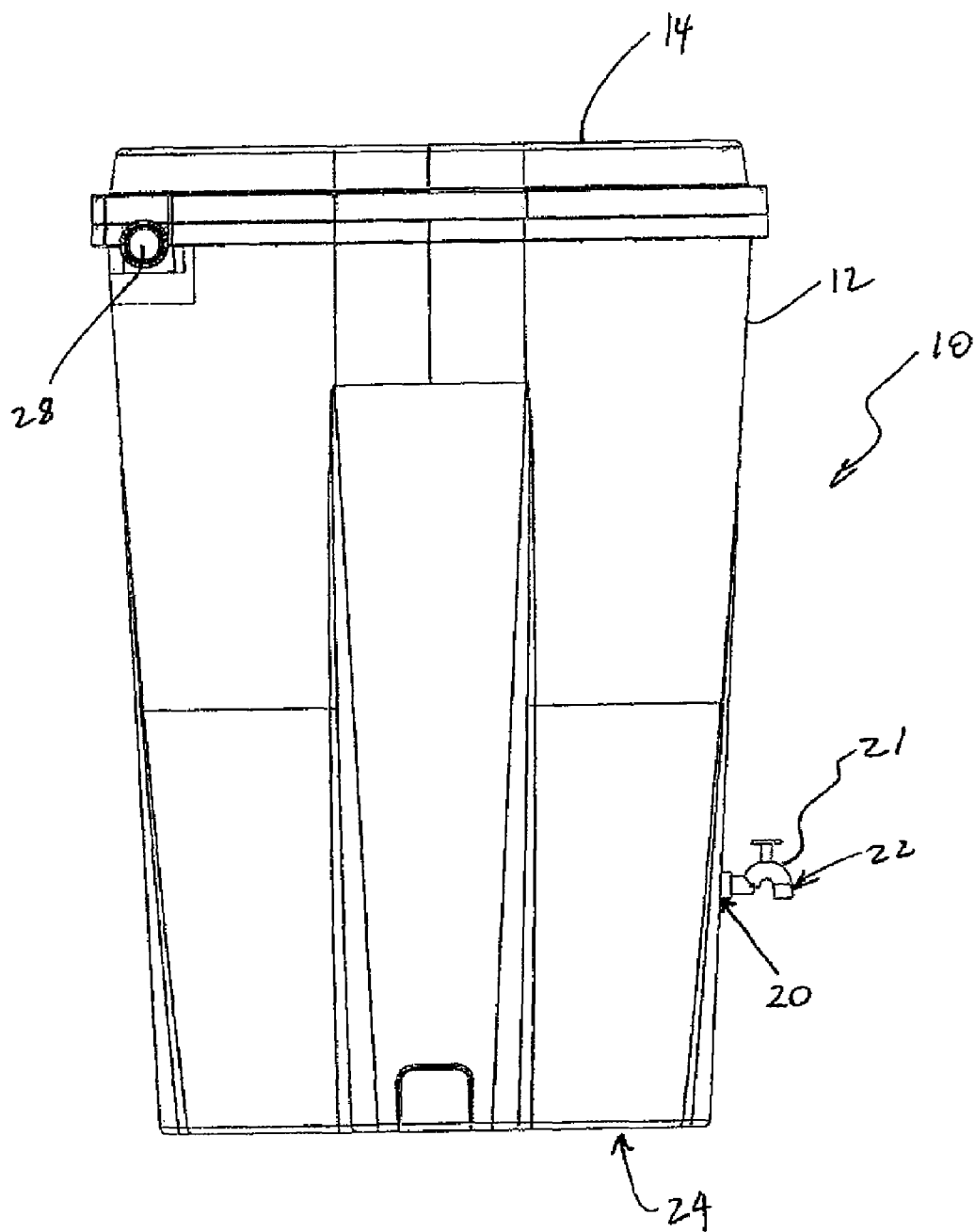
FIG. 3 is a side elevation view of the precipitation collector of FIG. 1.
Figure 4:
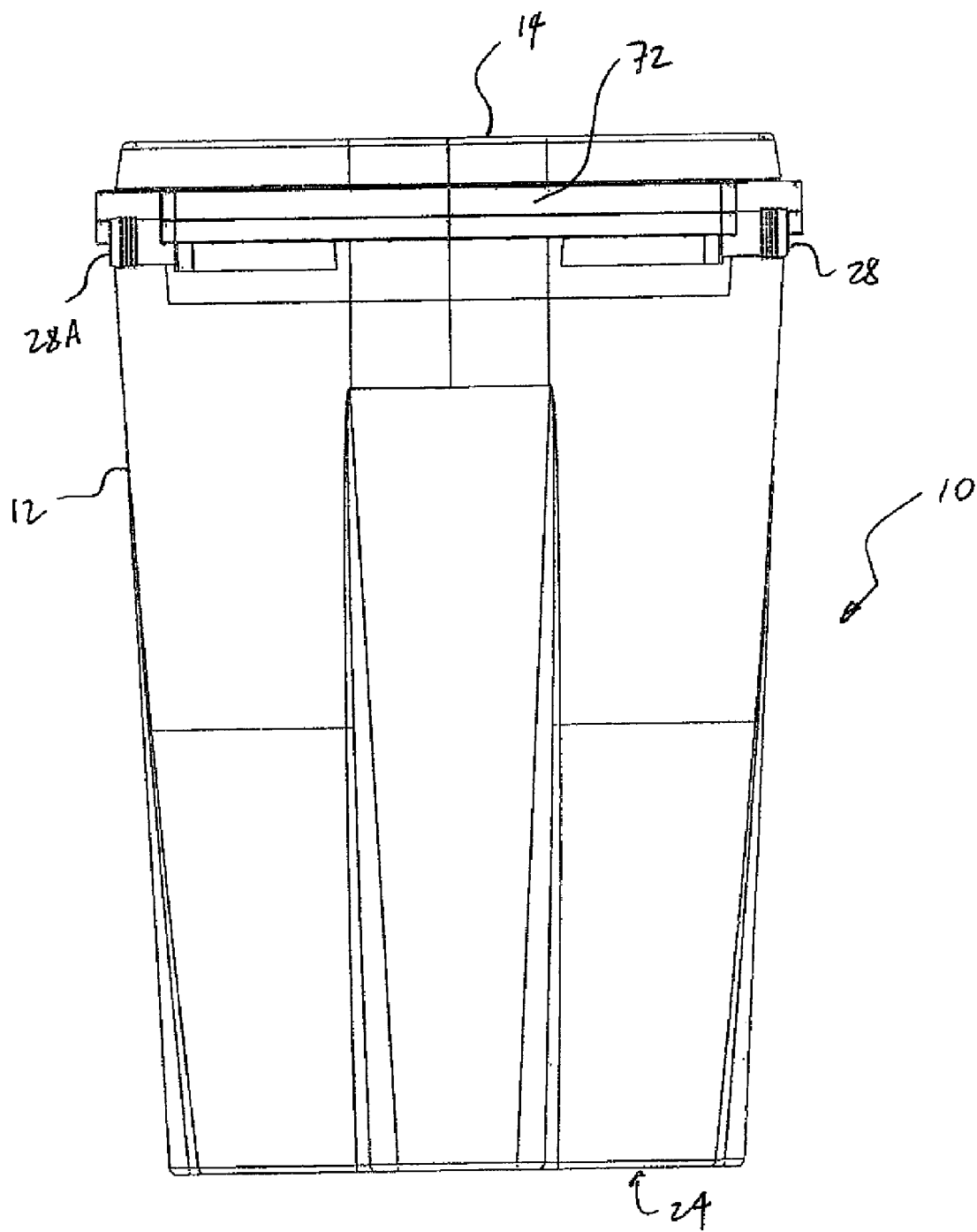
FIG. 4 is a rear elevation view of the precipitation collector of FIG. 1.
Figure 5:
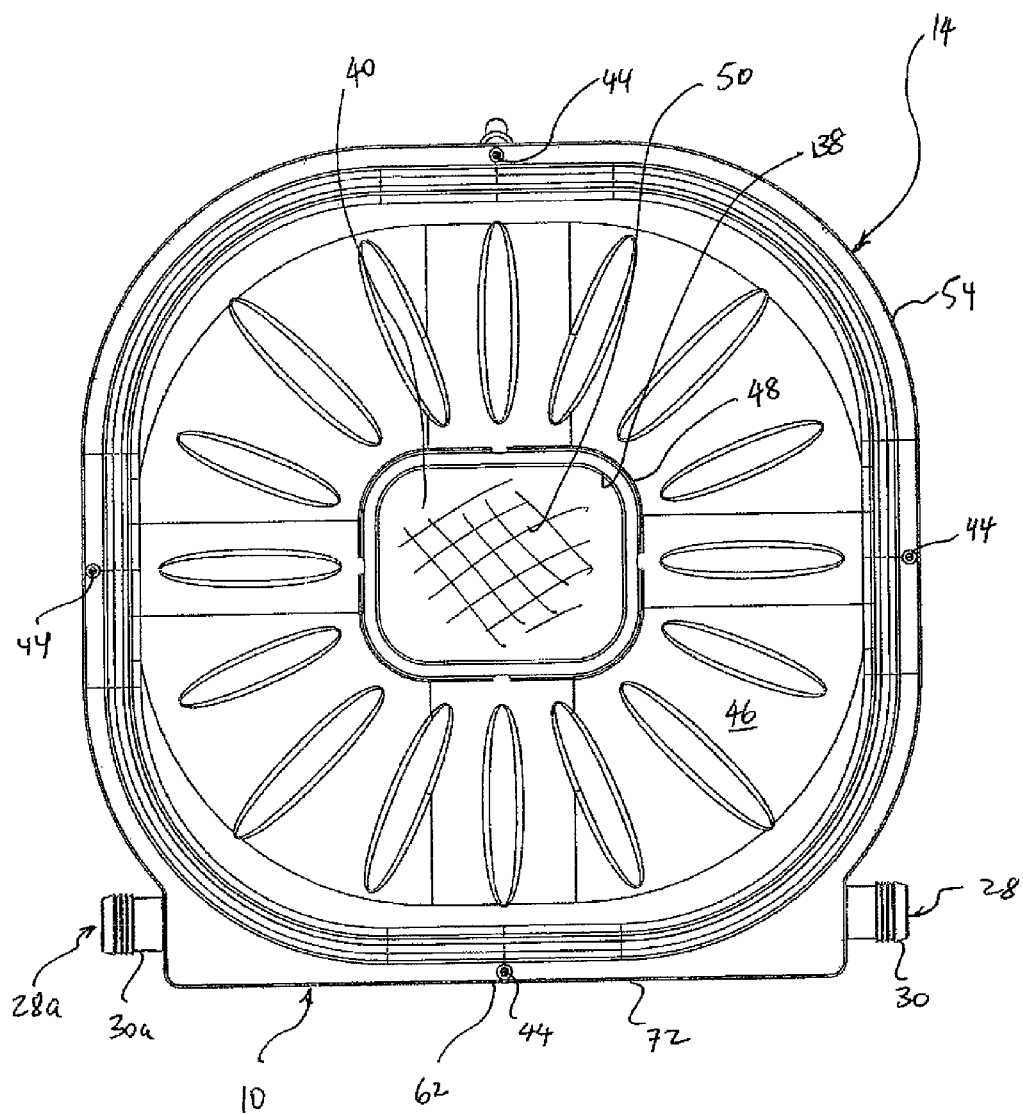
FIG. 5 is a top plan view of the precipitation collector of FIG. 1.
Figure 12:
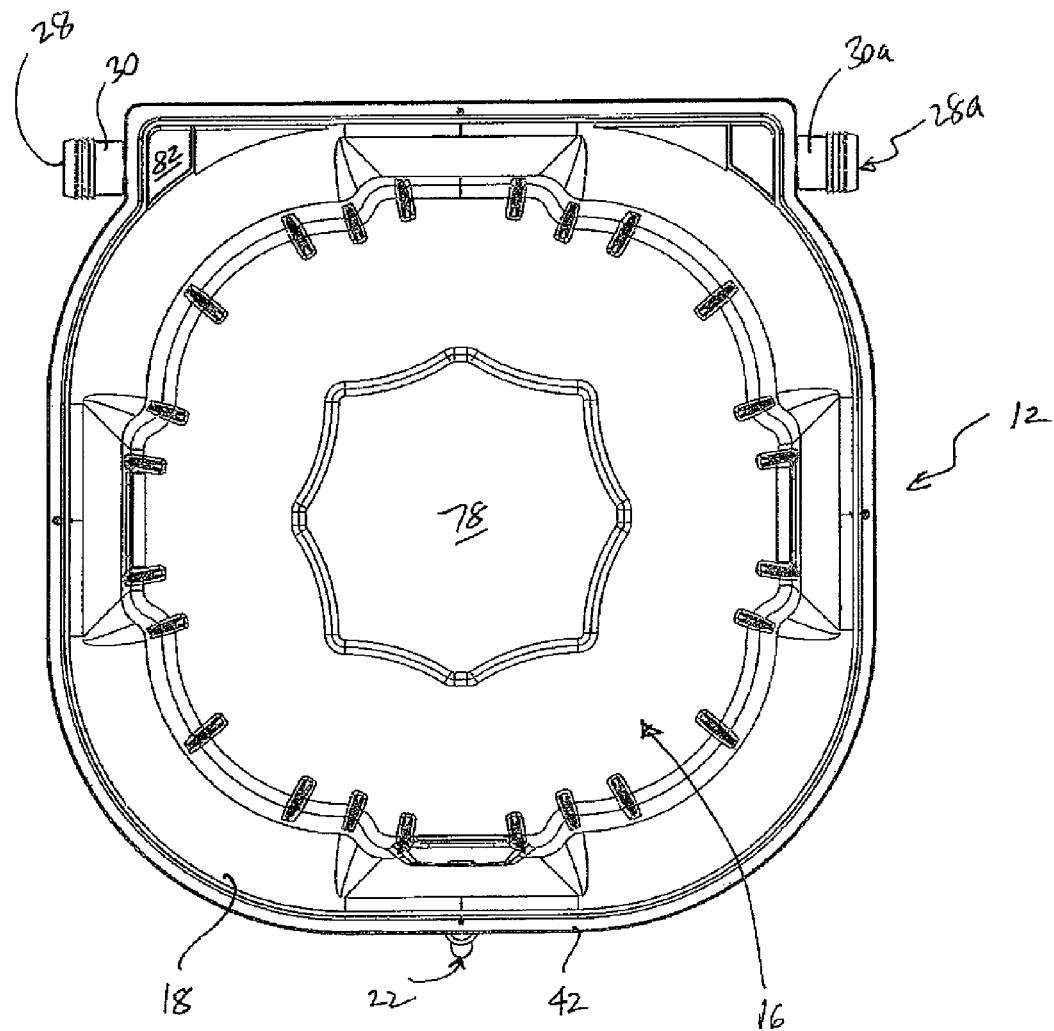
FIG. 12 is a top plan view of a container of the precipitation collector of FIG. 1.
Figure 13:
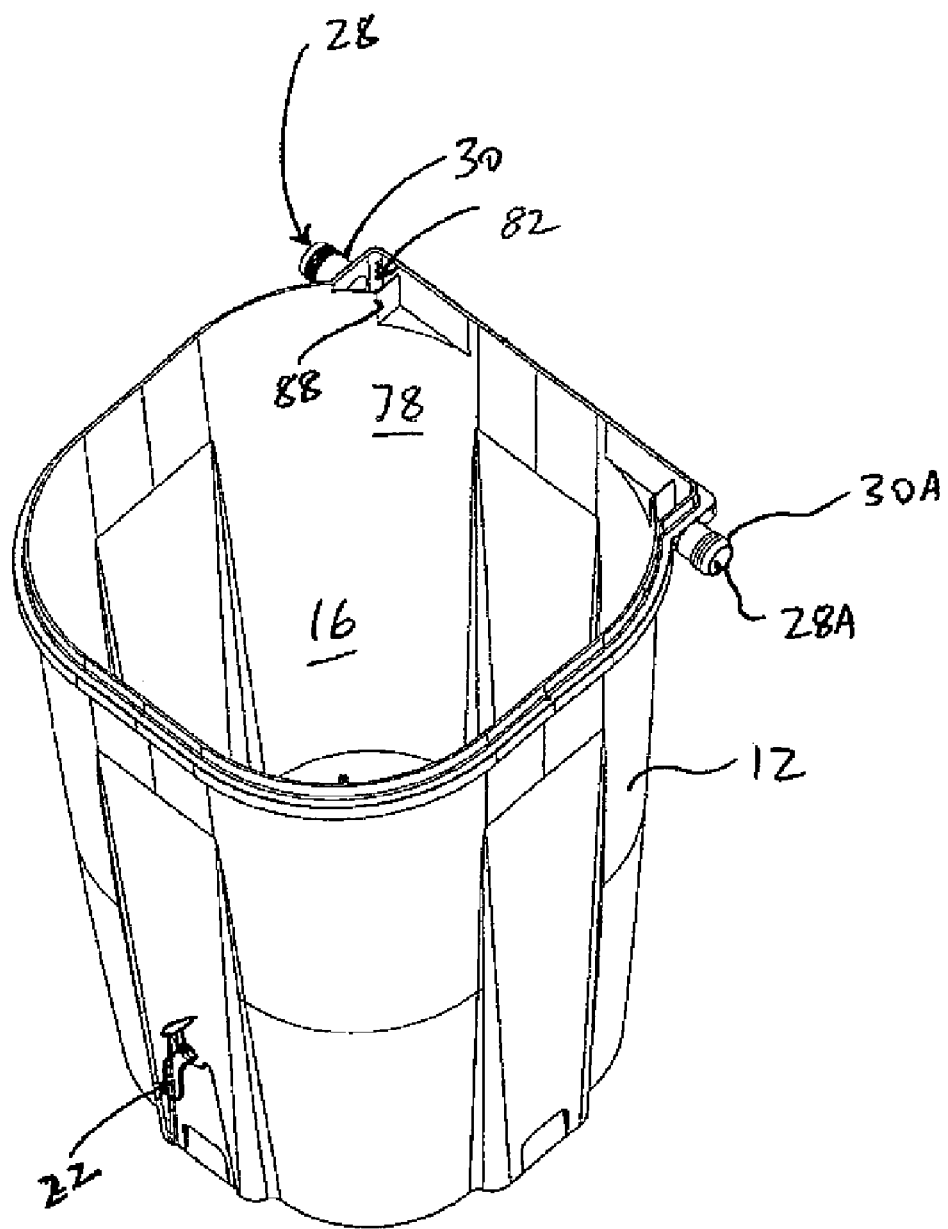
FIG. 13 is a top perspective view of a container of the precipitation collector of FIG. 1.
Figure 14:
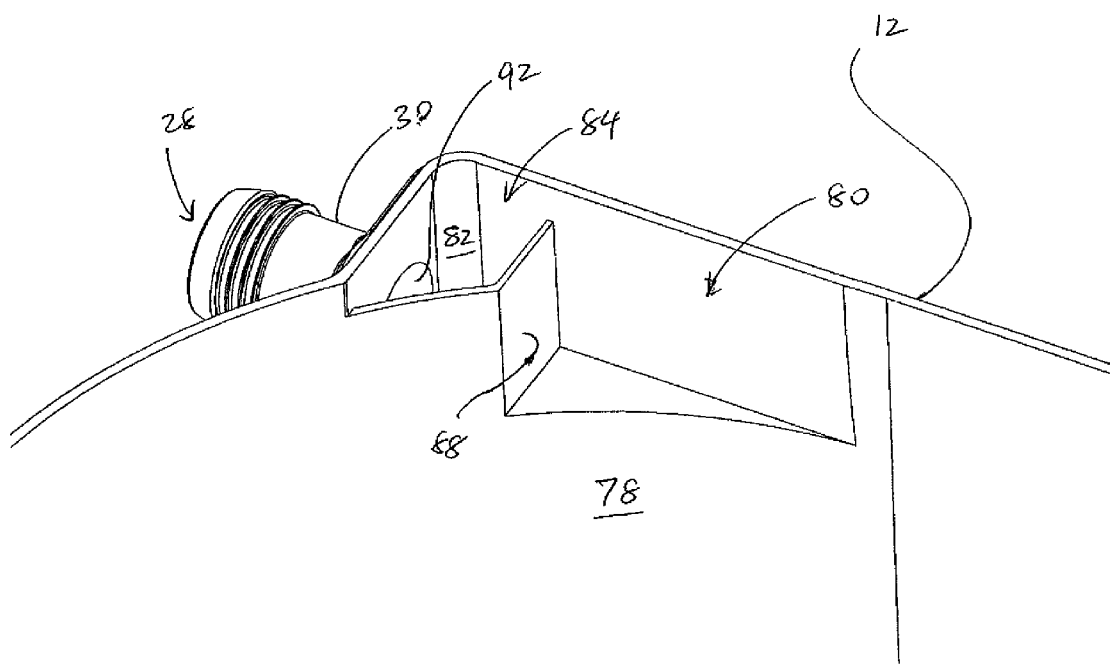
FIG. 14 is a top perspective view of a section of the container of FIG. 13, illustrating an overflow compartment of the precipitation collector.
Figure 15:
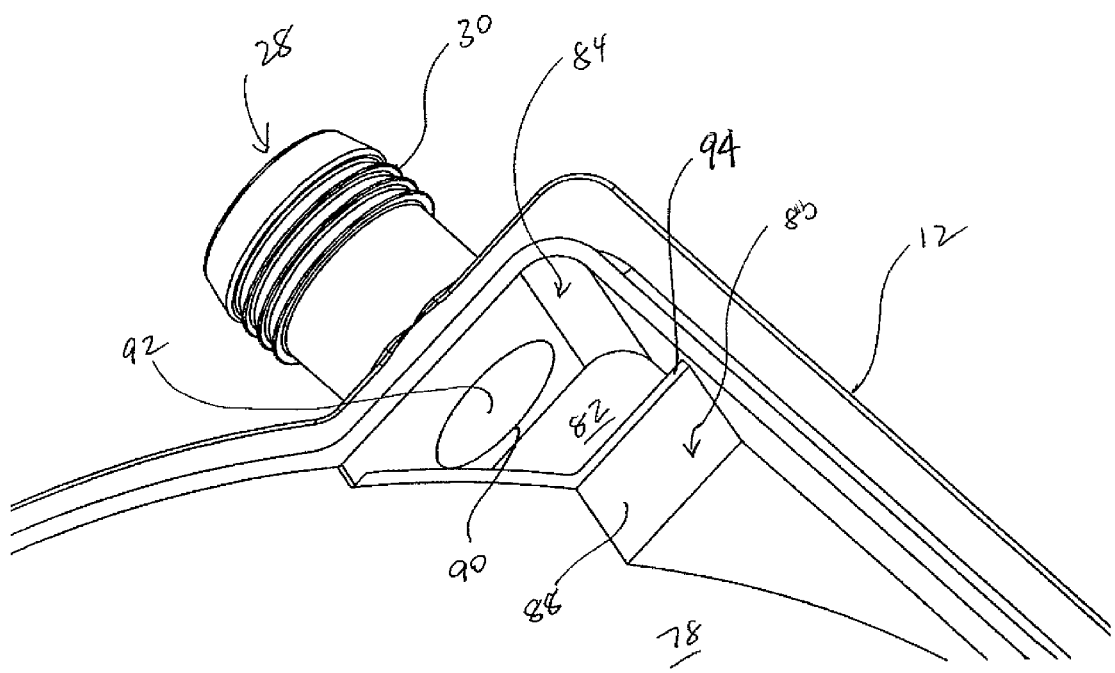
FIG. 15 is another top perspective view of a section of the container of FIG. 13, illustrating an overflow compartment of the precipitation collector.

Referring to FIG. 12, the container 12 includes a container space 16 configured for containing precipitation received through a container opening 18. Referring to FIG. 1, the container 12 includes a discharge outlet 20 which co-operates with a valve 21 coupled to the container 12 so as to define a selectively operable outlet 22 of the collector 10 for selectively discharging the received precipitation which has been collected within the container space 16.

In some embodiments, for example, the collector 10 includes a base 24 (such as a substantially planar base) and a continuous sidewall 25 extending from the base 24. The base 24 and the continuous sidewall 25 define the container space 16. The continuous sidewall 25 is suitably reinforced so as to resist hydrostatic pressure forces effected by precipitation which has been collected within the container space 16. For example, the reinforcement is effected by providing some regions 26 with thicker wall portions.

In some embodiments, for example, the continuous sidewall 25 of the container 12 is substantially square-shaped. This facilitates for the closely-spaced arrangement of multiple precipitation collectors, which thereby reduces space requirements for transportation.

The container 12 also includes an overflow outlet 28 configured for discharging an overflow of the received precipitation collected within the container space 16. In some embodiments, for example, two outlets 28, 28a are provided on opposite sides of the collector 10.

In some embodiments, for example, the overflow outlet 28 is defined by an overflow conduit structure 30 extending from an external surface 32 of the container 12. Similarly, where there is a second outlet 28a, second outlet 28a is defined by overflow conduit structure 30a.

In some embodiments, for example, the axis 34 of the overflow outlet 28 is disposed a minimum distance D3 of at least twenty (20) inches above the base 24 of the collector 10 when the base 24 is disposed on a reaction surface 36. For example, in some embodiments, the axis 34 is disposed 30.75 inches above the base 24 when the base 24 is disposed on a reaction surface 36.

The lid 14 is provided for partially covering the container opening 18. The lid 14 includes a lid passage 38 which defines a collector inlet 40 disposed in fluid communication with the container space 16 through the container opening 18. The lid passage 38 provides a passage for entry of environmental precipitation into the container space 16.

In some embodiments, for example, the lid 14 is coupled to the container 12. In some of these embodiments, for example, the lid 14 is coupled to a rim 42 of the container 12 with one or more fasteners. For example, the lid 14 is coupled to the rim 42 with screws 44.

In some embodiments, for example, a lid upper surface portion 46 extends from the periphery 48 of the lid passage 38 and is sloped downwardly towards the lid passage 38 so as to facilitate flow of precipitation collected on the lid upper surface portion 46 towards the lid passage 38.

In some embodiments, for example, a filter element 50 extends across the lid passage 38. The filter element mitigates the ingress of solid matter into the container space 16. For example, a suitable filter element includes a mesh. For example, in some embodiments, the filter element includes 16×16 per inch stainless steel mesh with a wire diameter of 0.0180 inch, with a rim (for example, made of plastic or aluminum) joined to the mesh and extending about the perimeter of the mesh.

In some embodiments, for example, the lid 14 includes a lip 52 extending about the periphery 48 of the lid upper surface portion 46, thereby containing precipitation collected on the lid upper surface portion 46 so as to mitigate movement of the collected precipitation over the peripheral edge 54 of the lid 14.

In some embodiments, for example, the valve 21 is a 45-degree garden faucet or "bib cock".

In some embodiments, for example, the material of one of, or each of, the container 12 and the lid 14 is plastic. For example, suitable plastics include polyethylene or polyvinyl chloride. For example, one of, or each of, the container 12 and the lid 14 is injection molded.

The precipitation collector 10 additionally includes any one of, or any combination of, the following aspects, including described exemplary embodiments of the following agents.

A1. Disposition of Overflow of Precipitation Collector

There is provided aspects relating to the disposition of the overflow of the container 12.

Figure 6:
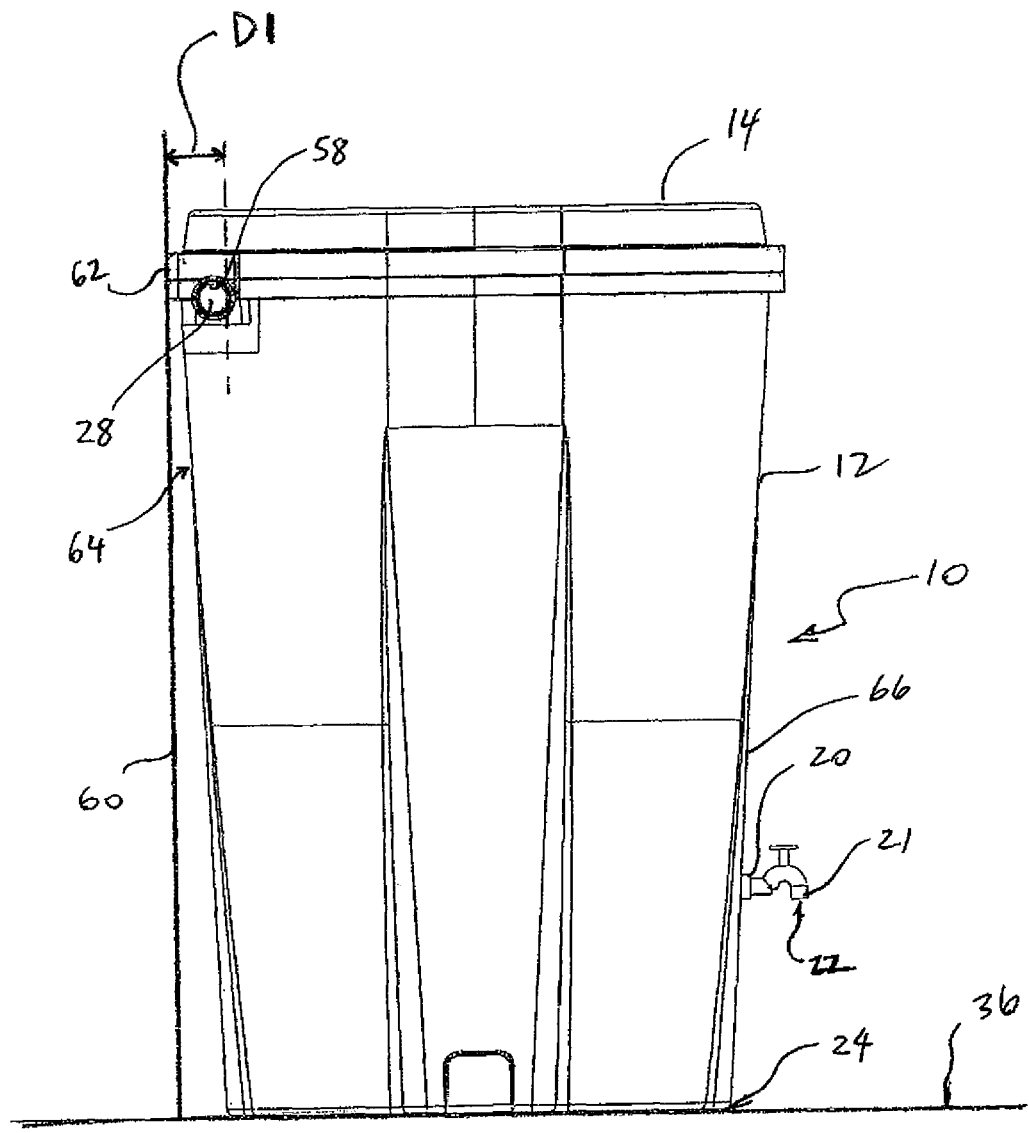
FIG. 6 is another side elevation view of the precipitation collector of FIG. 1, illustrating the dimension D1.
Figure 7:
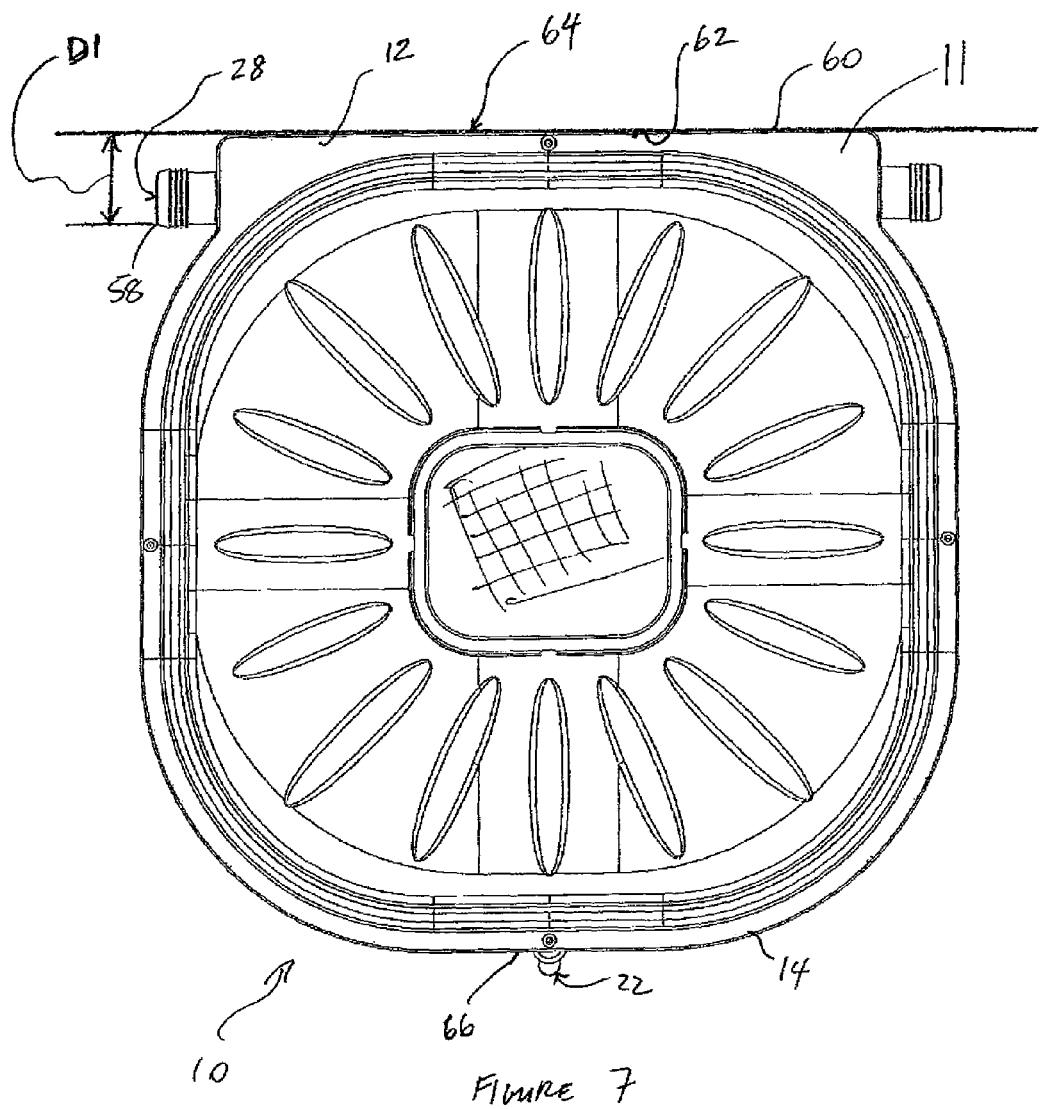
FIG. 7 is another top plan view of the precipitation collector of FIG. 1, illustrating the dimension D1.

In this respect, in one aspect, and referring to FIGS. 6 and 7, the overflow outlet 28 of the container 12 is configured for discharging an overflow of the received precipitation collected within the container space 16. An edge of the perimeter 58 of the overflow outlet 28, disposed furthest from a reference vertical plane 60 tangent to an operative outermost external surface portion 62 of the collector 10, is disposed at a minimum distance D1 of less than six (6) inches from the reference vertical plane 60 when the operative outermost external surface portion 62 is positioned adjacent to the reference vertical plane 60 when the container 12 is supported on a horizontal reaction surface 36. For example, in some embodiments, the edge of the perimeter 58 is disposed 2.5 inches from the reference vertical plane 60 when the operative outermost external surface portion 62 is positioned adjacent to the reference vertical plane 60 when the container 12 is supported on a horizontal reaction surface 36. The operative outermost external surface portion 62 is disposed on an operative external surface portion 64 of the collector 10. The operative external surface portion 64 of the container 12 is that portion of the external surface 11 of the collector 10 which is opposite from the external surface portion 66 at which the discharge outlet 20 is disposed. The operative outermost external surface portion 62 is a portion of the operative external surface portion 64 which extends furthest outwardly relative to other portions of the operative external surface portion 64 when the collector 10 is supported on a horizontal reaction surface 36.

Figure 8:
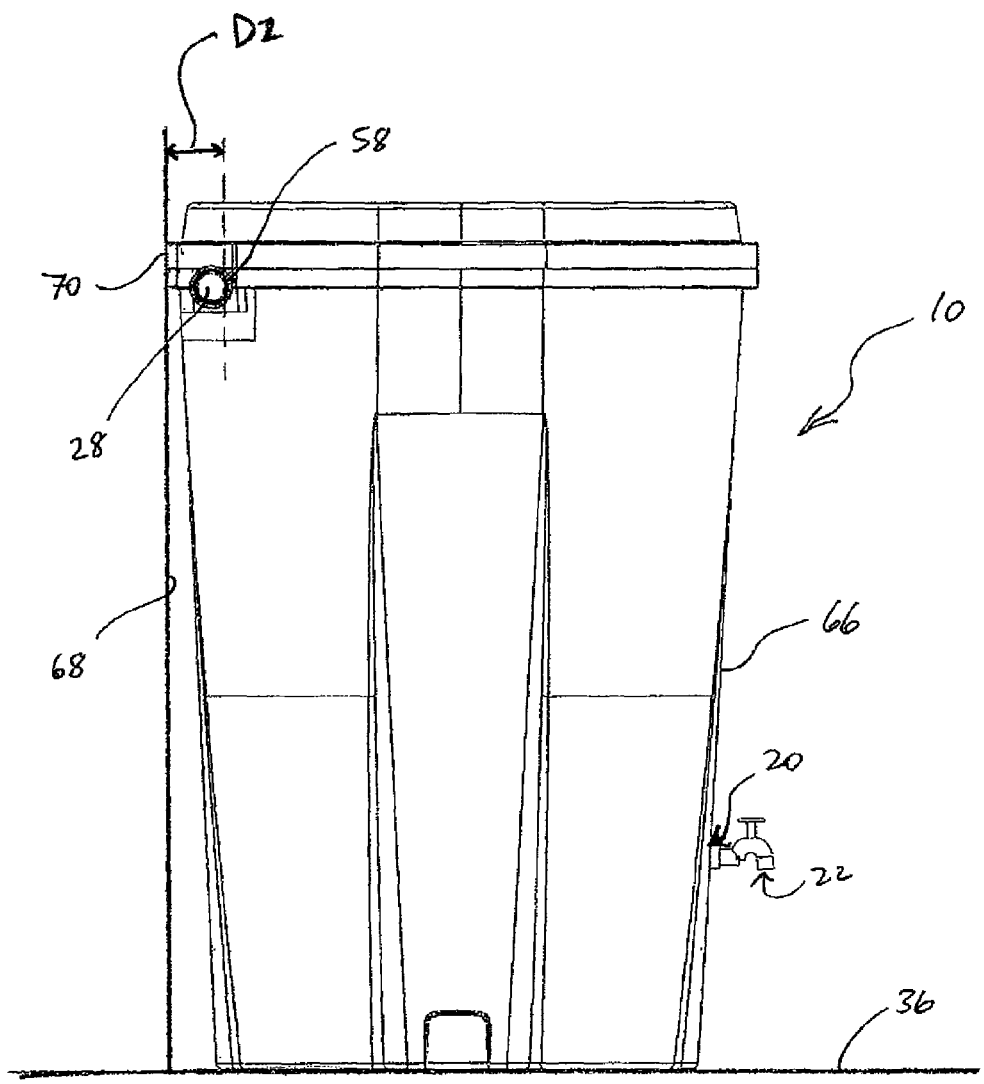
FIG. 8 is another side elevation view of the precipitation collector of FIG. 1, illustrating the dimension D2.
Figure 9:
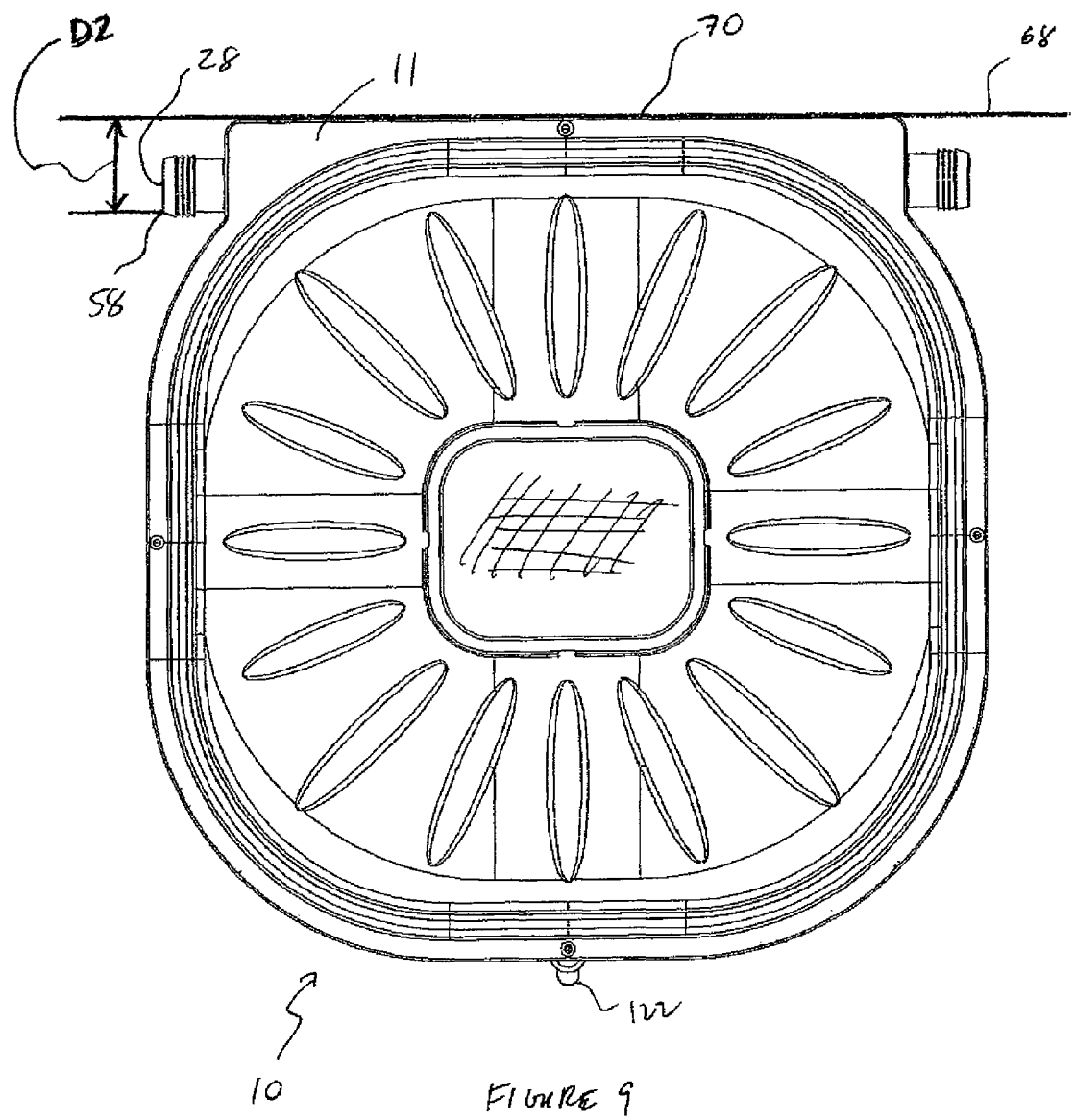
FIG. 9 is another top plan view of the precipitation collector of FIG. 1, illustrating the dimension D2.

In another related aspect, and referring to FIGS. 8 and 9, the overflow outlet 28 of the container 12 is configured for discharging an overflow of the received precipitation collected within the container space 16. An edge of the perimeter 58 of the overflow outlet 28, disposed furthest from an operative planar vertical surface 68, is disposed at a minimum distance D2 of less than six (6) inches from the operative planar vertical surface 68 when a position-operative external surface portion 70 of the collector 10 is positioned adjacent to the operative planar vertical surface 68 when the collector 10 is supported on a horizontal reaction surface 36. The position-operative external surface portion 70 is a portion of the external surface 11 of the collector 10 which is opposite from the external surface portion 66 at which the discharge outlet 20 is disposed. For example, in some embodiments, the edge of the perimeter 58 is disposed 2.5 inches from the operative planar vertical surface 68 when a position-operative external surface portion 70 of the collector 10 is positioned adjacent to the operative planar vertical surface 68 when the collector 10 is supported on a horizontal reaction surface 36.

Figure 10:
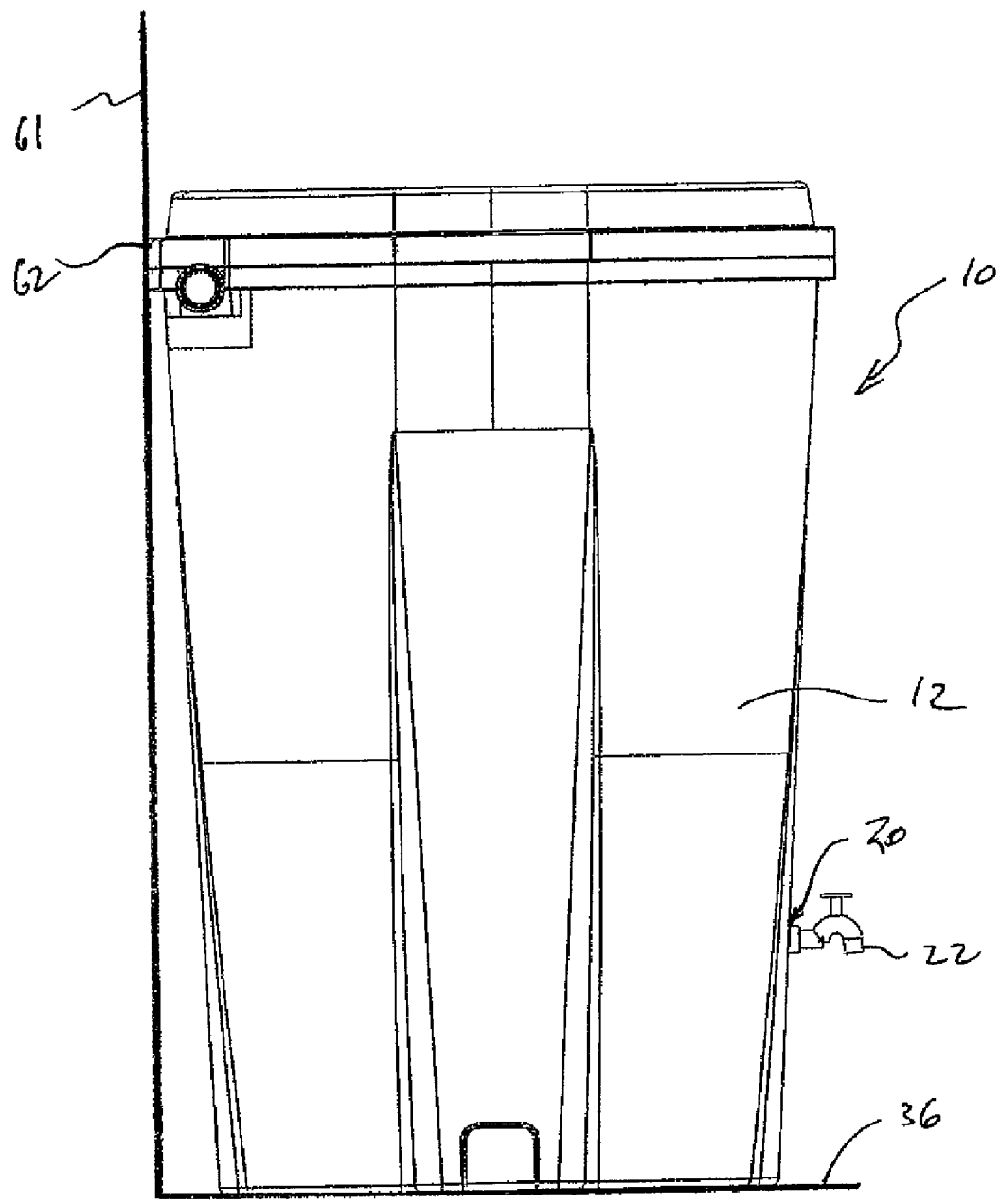
FIG. 10 is another side elevation view of the precipitation collector of FIG. 1, illustrating a relationship between the precipitation collector of FIG. 1 and a reference planar vertical surface.

In some embodiments of a precipitation collector 10 including either one of the above-described aspects, for example, and referring to FIGS. 9 and 10, the operative outermost external surface portion 62 is a portion of a substantially planar surface portion 72 which is contiguous to the reference vertical plane 60 when the collector 10 is supported on a horizontal reaction surface 36. In some of these embodiments, for example, the substantially planar surface portion 72 includes a length of at least ten (10) inches. For example, in some embodiments, the length is twenty (20) inches.

Figure 11:
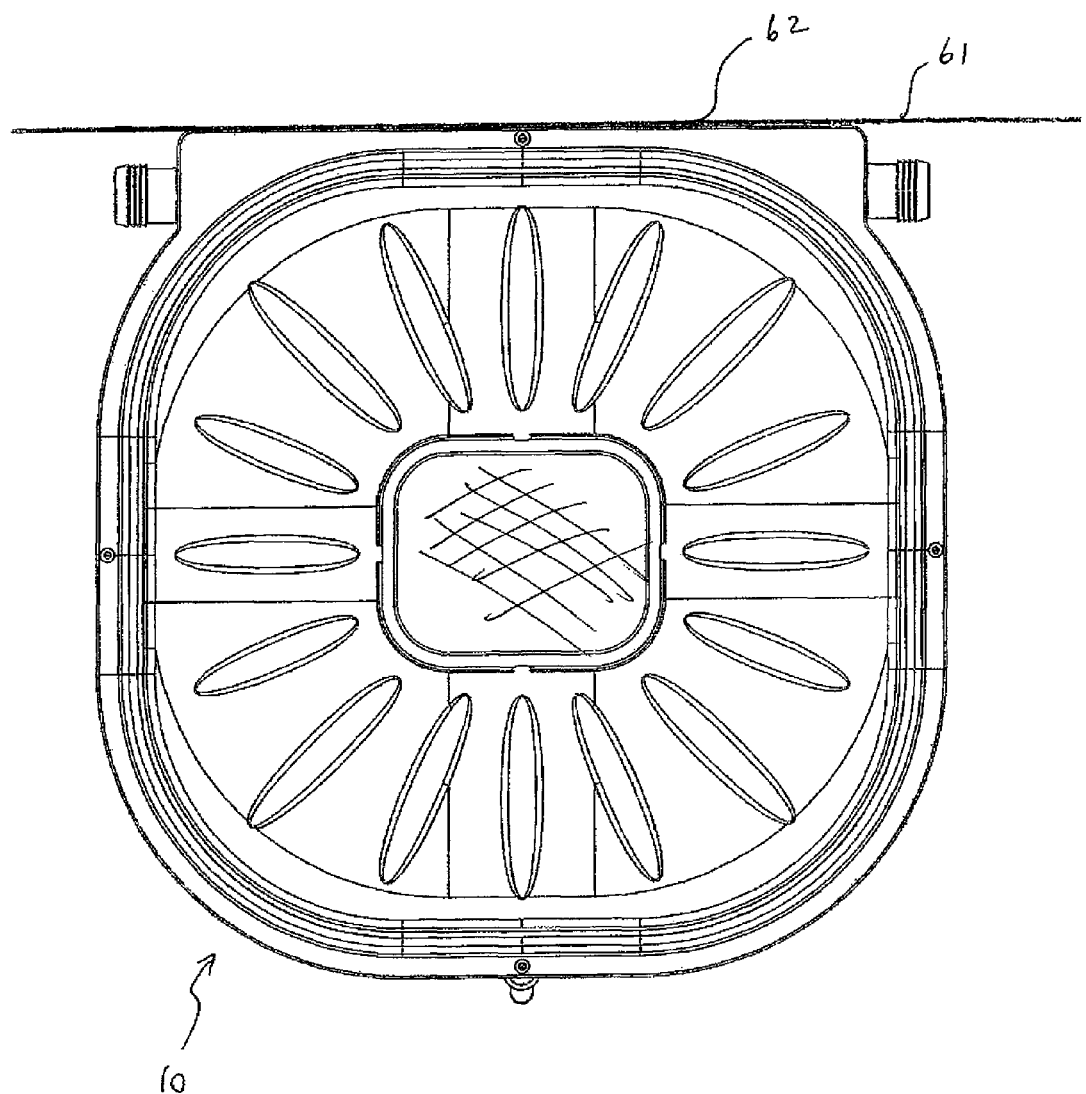
FIG. 11 is another top plan view of the precipitation collector of FIG. 1, illustrating a relationship between the precipitation collector of FIG. 1 and a reference planar vertical surface.

Referring to FIGS. 10 and 11, in some embodiments of a precipitation collector 10 including either one of the above-described aspects, for example, the operative outermost external surface portion 62 of the container 12 is shaped to co-operate with a planar vertical surface 61 such that the container 12 is positionable so that the operative outermost external surface portion 62 is disposed contiguous to the planar vertical surface 61 when the collector 10 is supported on a horizontal reaction surface 36.

A2. Precipitation Collector with Overflow Compartment

Referring to FIGS. 12 to 15, another aspect of the precipitation collector 10 which is provided is a container 12 with separate overflow and precipitation containment compartments 84, 80. The overflow containment compartment 84 enables the container 12 to receive and contain a larger volume of precipitation, before capacity is exceeded and the collected precipitation overflows the container 12. This is because, with a separate overflow compartment 84, the liquid level in the precipitation containment compartment 80 is permitted to closer approach the top of the container 12 before being directed to an overflow outlet 28. In those embodiments with two overflow outlets 28, 28a, a corresponding overflow compartment 84 may be provided for each of the outlets 28, 28a.

In this respect, the container space 16 includes a precipitation containment compartment space 78 provided in a precipitation containment compartment 80 and an overflow containment compartment space 82 provided in an overflow compartment 84. The precipitation containment compartment 80 is configured to receive precipitation through a container opening 18. The overflow containment compartment space 82 is configured for receiving an overflow of precipitation from the precipitation containment compartment 80. An overflow fluid passage 86 is disposed in fluid communication with the overflow compartment space 82 for effecting discharge of precipitation collected within the overflow containment compartment space 82 through the overflow outlet 28.

In some embodiments of a precipitation collector 10 including separate overflow and precipitation containment compartments 84, 80, for example, the overflow fluid passage 86 extends from the overflow containment compartment space 82.

In some embodiments of a precipitation collector 10 including separate overflow and precipitation containment compartments 84, 80, for example, the overflow containment compartment space 82 is separated from the precipitation containment compartment 80 by a weir 88. The overflow of precipitation from the precipitation containment compartment 80 is effected when the level of the precipitation within the container 12 exceeds the height of the weir 88.

In some embodiments of a precipitation collector 10 including separate overflow and precipitation containment compartments 84, 80, the overflow fluid passage 86 extends from the overflow containment compartment space 82 through a container wall overflow fluid passage-defining portion 92. The lowermost edge 90 of the container wall overflow fluid passage-defining portion 92 is disposed below the upper edge 94 of the weir 88 when the base 24 of the collector 10 is supported on a substantially horizontal reaction surface 36 (see FIG. 15). For example, when the base 24 of the collector 10 is supported on a substantially horizontal reaction surface 36, the lowermost edge 90 of the container wall overflow fluid passage-defining portion is disposed below the upper edge 94 of the weir 88 by a minimum distance of at least 0.75 inches. As another example, when the base 24 of the collector 10 is supported on a substantially horizontal reaction surface 36, the lowermost edge 90 of the container wall overflow fluid passage-defining portion 92 is disposed below the upper edge 94 of the weir 88 by 1.75 inches.

In some embodiments of a precipitation collector 10 including separate overflow and precipitation containment compartments 84, 80, for example, the precipitation containment compartment 80 is positioned to receive precipitation through the container opening 18.

In some embodiments of a precipitation collector 10 including separate overflow and precipitation containment compartments 84, 80, for example, the precipitation containment compartment 80 is disposed in alignment with the lid passage 38.

In some embodiments, for example, the overflow fluid passage 86 includes a minimum cross-sectional area of at least 1.2 square inches. In some embodiments, for example, the overflow fluid passage 86 includes a minimum cross-sectional area of between 1.2 square inches and 3.0 square inches In some embodiments, for example, the overflow fluid passage 86 includes a minimum cross-sectional area of 1.7 square inches.

B. Kit for Assembling a Precipitation Collector.

A kit is provided for assembling a precipitation collector 10. The precipitation collector 10 is provided for receiving and collecting all forms of environmental precipitation which are capable of entering the precipitation collector 10 through a lid opening 38, such as rain, sleet and snow.

The kit includes a container 12 and a lid 14, and optionally includes a valve 21. In some embodiments, the kit further includes instructions for effecting coupling of the valve 21 to the container 12, as is described below.

Referring to FIGS. 18 to 22, the container 12 including a container space 16 configured for containing precipitation received through a container opening 18. The container 12 includes a discharge outlet 20, and either: (a) a selectively operable outlet 22 for selectively discharging precipitation which has been received within the container space 16 is defined by a valve 21 fluidly coupled to the discharge outlet 20, or (b) a valve 21 is provided and configured for fluid coupling to the container 12 to thereby co-operate with the discharge outlet 20 such that the valve 21 is operable to effect selective discharge, through the discharge outlet 20, of received precipitation which has been collected within the container space 16.

Figure 37:
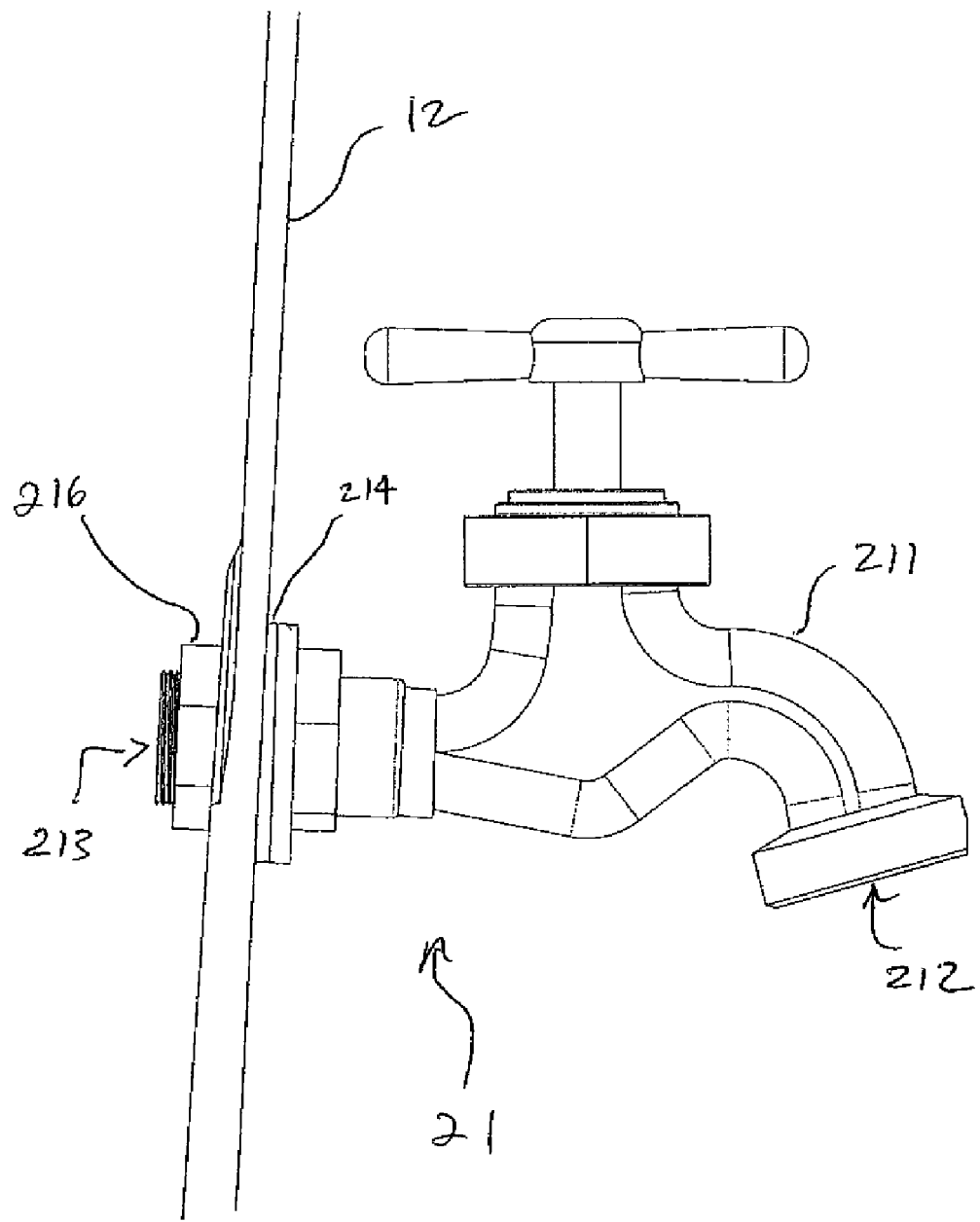
FIG. 37 is a sectional elevation view of a section of the container of the kit of FIG. 18, illustrating the integration of a valve with the container.

In some embodiments, for example, and referring to FIGS. 37 and 38, the valve 21 includes a brass spigot 211. The brass spigot 211 includes a discharge port 212 which fluidly communicates with a fluid source port 213, and the fluid source port is configured for receiving a flow of collected precipitation from the container space 16, and the flow of collected precipitation flows through the discharge port 212 when a sealing element of the brass spigot 211 is disposed in an open position, thereby permitting flow between the fluid source port 213 and the discharge port 212. The fluid source port 213 is externally threaded. Coupling of the brass spigot 211 to the discharge outlet 20 is effected by fitting a rubber gasket 214 over the fluid source port 213 of the brass spigot 211 and then inserting the fluid source port 213 through the discharge outlet 20 such that the fluid source port 213 becomes disposed within the container space 16, and the rubber gasket is pressed against an external surface of the container 12. Next, a washer 215 is fitted over the fluid source port 213, and an internally threaded brass nut 216 is threadably coupled to the fluid source port 213 such that the washer 215 is pressed between the brass nut 216 and an internal surface of the container 12 and such that the spigot 211 becomes coupled to the container 12 and disposed in fluid communication with the container space 16.

Figure 17:
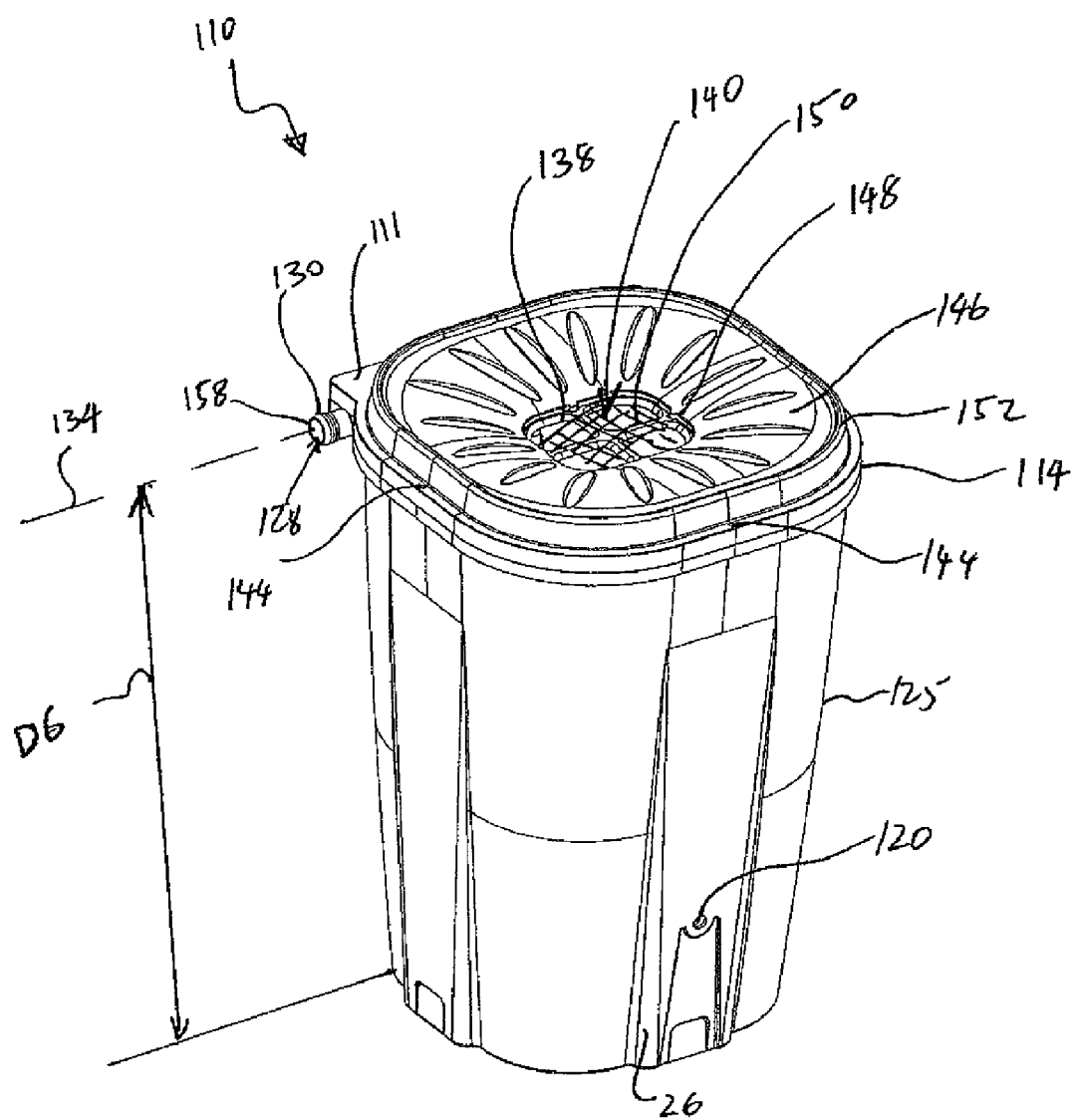
FIG. 17 is a top perspective view of an embodiment of a kit for assembling a precipitation collector.
Figure 18:
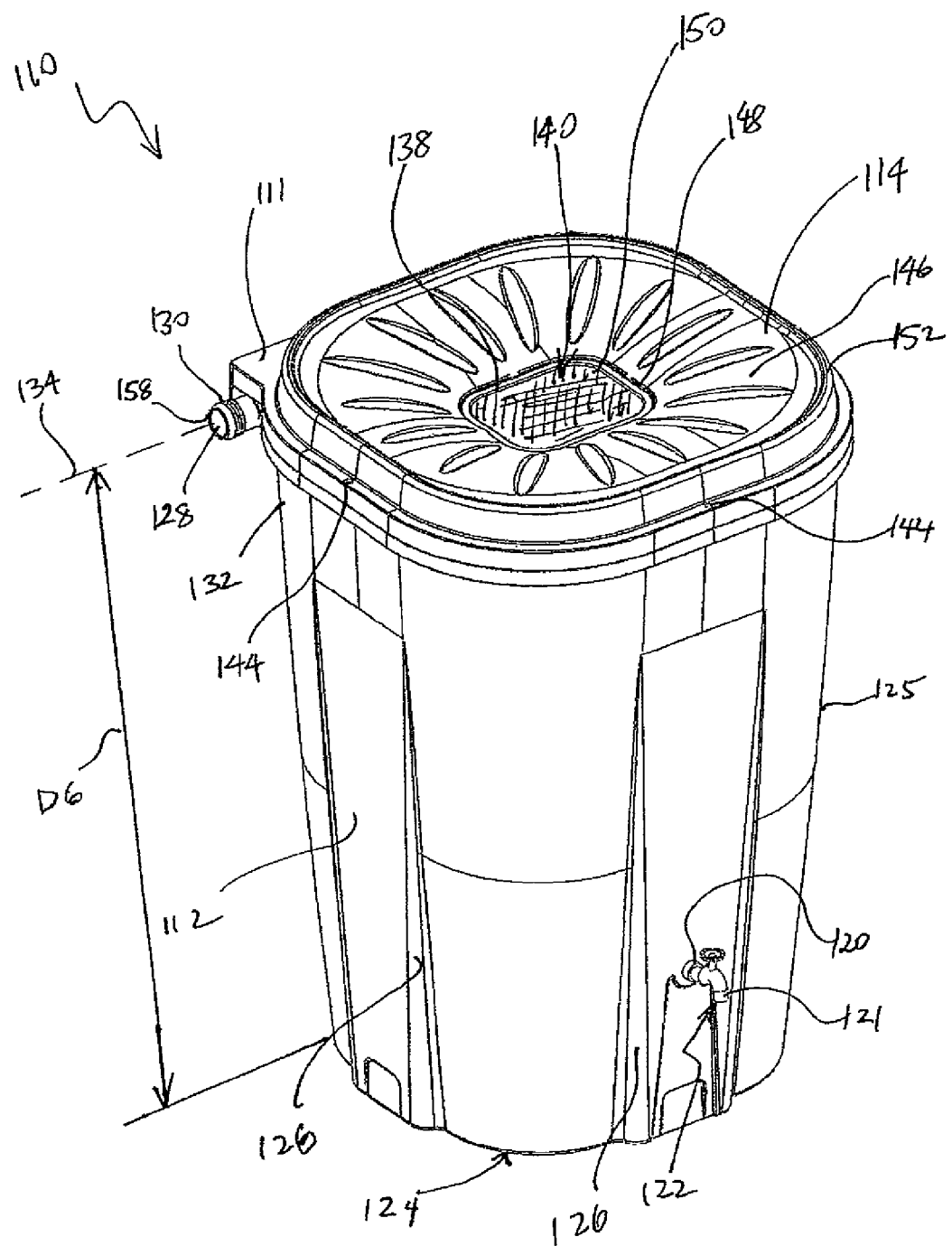
FIG. 18 is a top perspective view of another embodiment of a kit for assembling a precipitation collector.
Figure 19:
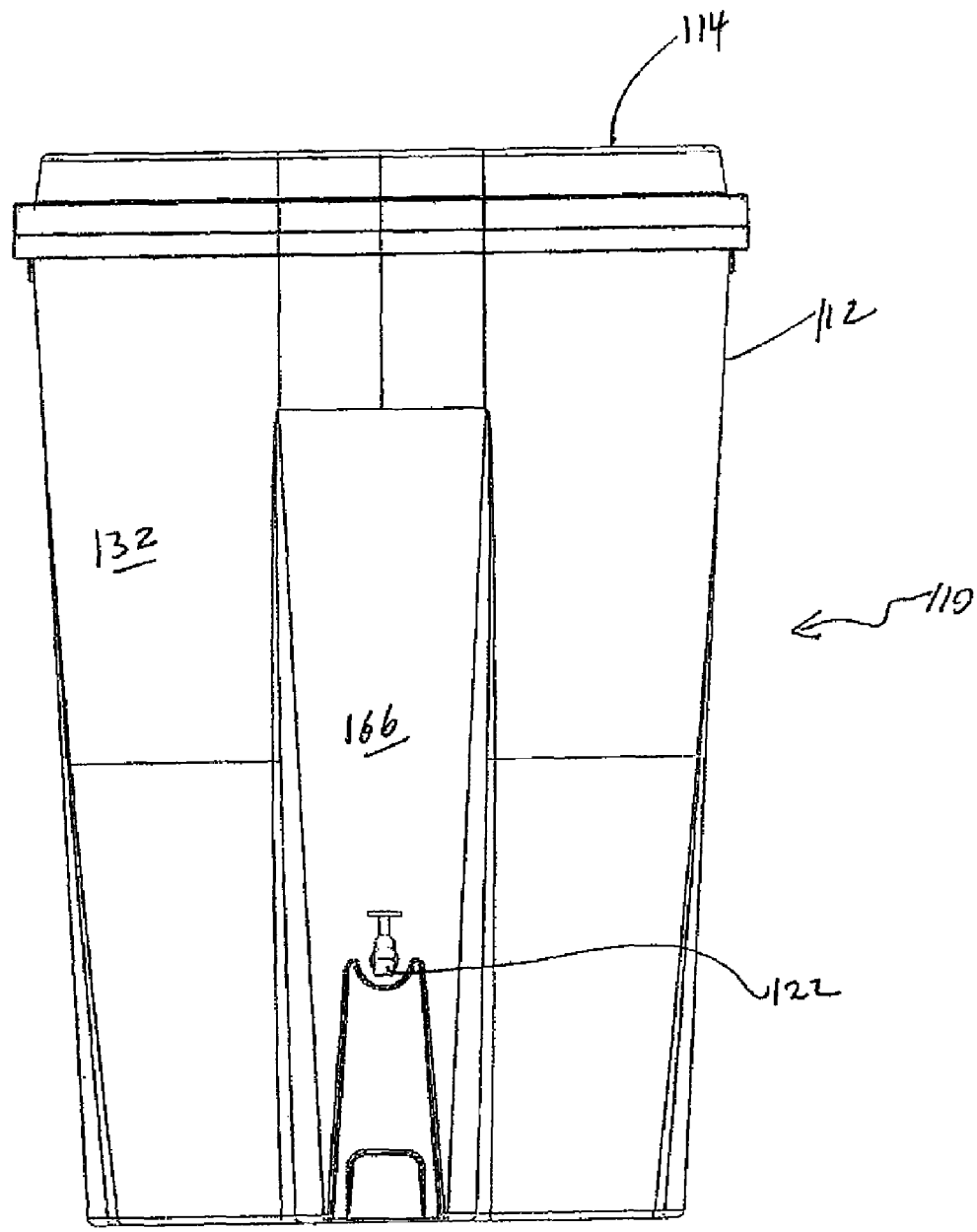
FIG. 19 is a front elevation view of the kit of FIG. 1.
Figure 20:
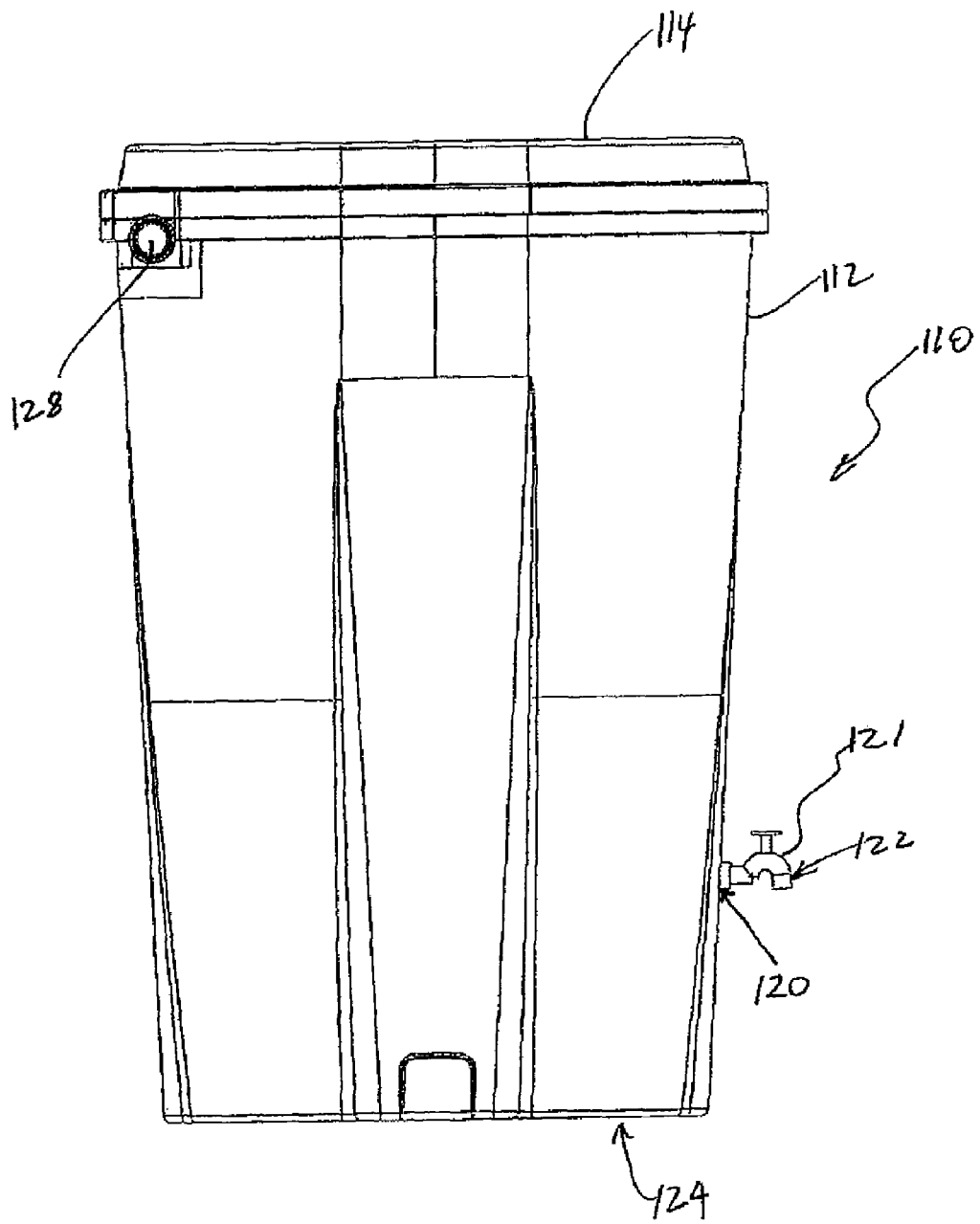
FIG. 20 is a side elevation view of the kit of FIG. 18.
Figure 21:
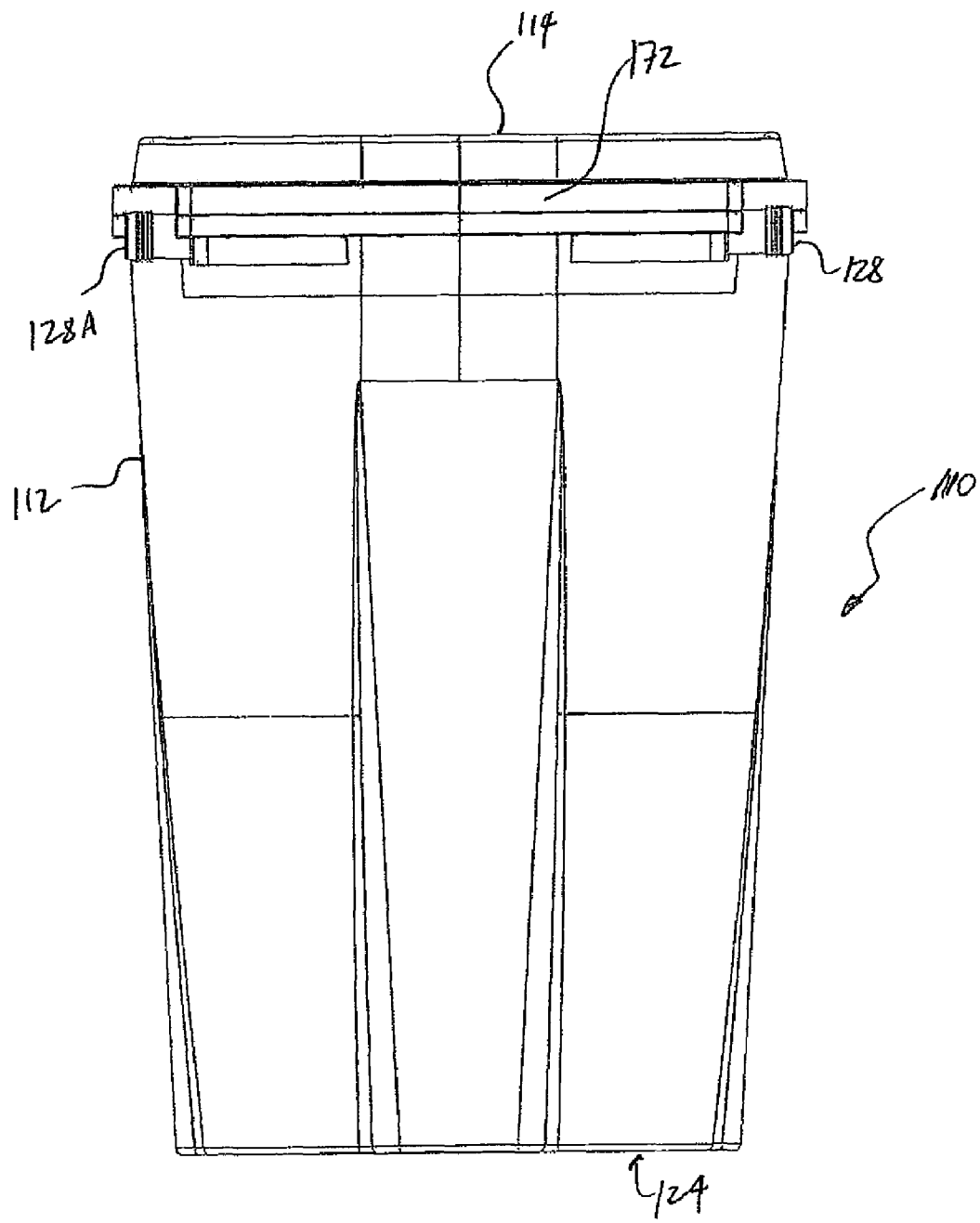
FIG. 21 is a rear elevation view of the kit of FIG. 18.
Figure 22:
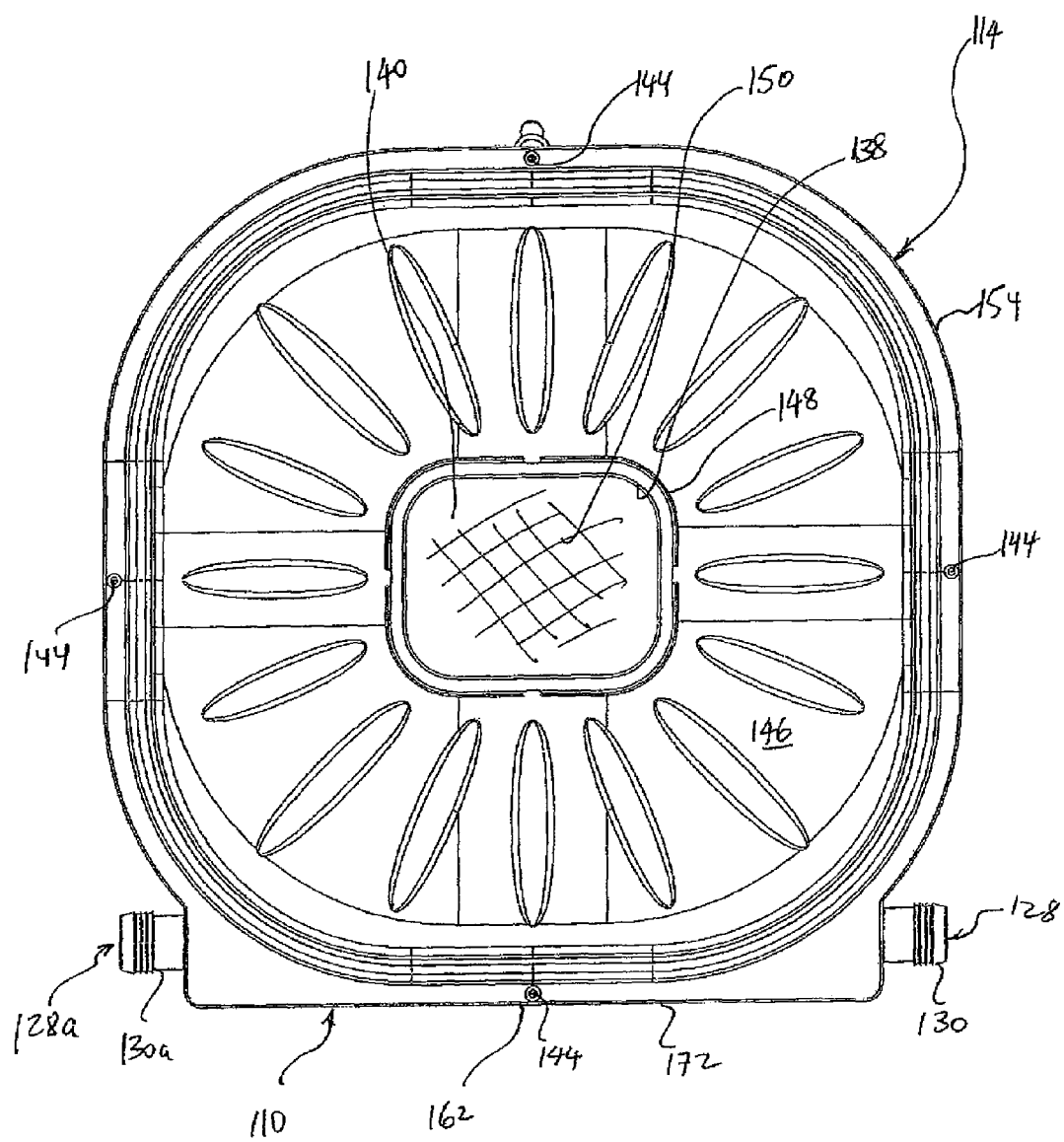
FIG. 22 is a top plan view of the kit of FIG. 18.

FIG. 17 illustrates a container 12 and a lid 14 of a kit where a valve 21 must still be installed and the container 12 is coupled to the lid 14. FIG. 18 illustrates a kit where the valve is already coupled to the container 12, and the lid 14 is coupled to the container 12.

Otherwise, the container 12 and the lid 14 of the kit illustrated in FIG. 17 is identical to the container 12 and the lid 14 of the kit illustrated in FIG. 18.

In some embodiments, for example, the collector 10 includes a base 24 (such as a substantially planar base) and a continuous sidewall 25 extending from the base 24. The base 24 and the continuous sidewall 25 define the container space 16. The continuous sidewall 25 is suitably reinforced so as to resist hydrostatic pressure forces effected by precipitation which has been collected within the container space 16. For example, the reinforcement is effected by providing some regions 26 with thicker wall portions.

In some embodiments, for example, the continuous sidewall 25 of the container 12 is substantially square-shaped. This facilitates for the closely-spaced arrangement of multiple precipitation collectors, which thereby reduces space requirements for transportation.

The container 12 also includes an overflow outlet 28, or an outlet-creating portion 98 (see the embodiment illustrated in FIGS. 33 to 36) configured for separation from the container 12 to effect fluid communication between the container space 16 and an overflow outlet 28, wherein the overflow outlet 28 is configured for discharging an overflow of the received precipitation which has been collected within the container space 16. In some embodiments, a second overflow outlet 28a, or a second outlet-creating portion 98a is provided.

Figure 36:
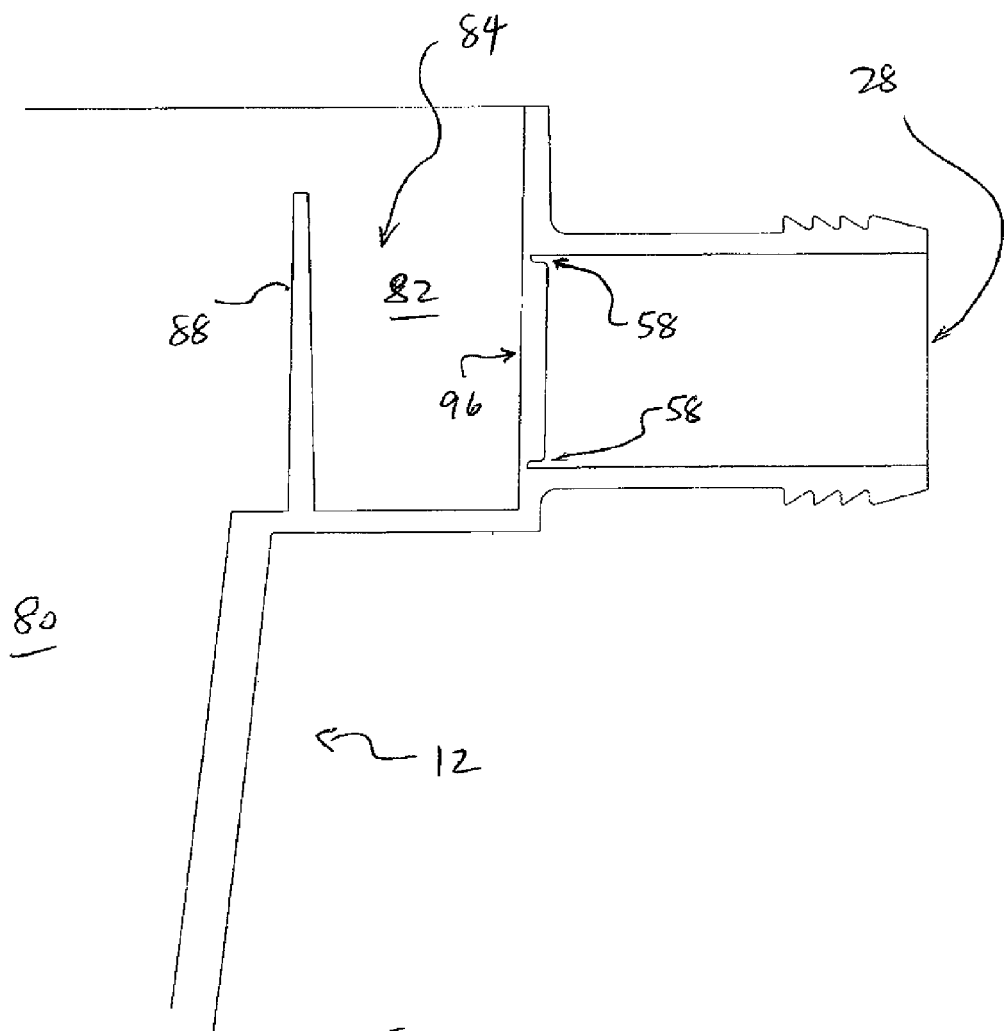
FIG. 36 is a sectional elevation view of a section of the container of FIG. 34, illustrating an outlet-creating portion of an overflow compartment of the container, which is configured for separation from the container.

In some embodiments, for example, and referring to FIG. 36, the outlet-creating portion 98 is defined by a weakened portion 96 of the container 12 and is configured for separation from the container 12 by applying a pressing force to the weakened portion 96. In some of these embodiments, for example, and referring to FIG. 36, the weakened portion 96 includes a perimeter 58 whose wall thickness is thinner relative to a container portion disposed peripherally of the perimeter 58.

In some embodiments, for example, the overflow outlet 28 is defined by an overflow conduit structure 30 extending from an external surface 32 of the container 12. In those embodiments with second overflow outlet 28a or a second outlet creating portion 98a, a second overflow conduit structure 30a is provided.

In some embodiments, for example, the axis 34 of the overflow outlet 28 is disposed a minimum distance D6 of at least twenty (20) inches above the base 24 of the collector 10 when the base 24 is disposed on a reaction surface 36. For example, in some embodiments, the axis 34 is disposed 30.75 inches above the base 24 when the base 24 is disposed on a reaction surface 36.

The lid includes a lid passage 38 which defines a collector inlet 40. The lid 14 is either: (a) coupled to the container 12 and partially covering the container opening 18, and the collector inlet 40 is disposed in fluid communication with the container space 16 through the container opening 18 such that the lid passage 38 provides a passage for entry of environmental precipitation into the container space 16, or (b) positionable relative to the container 12 to an operative position for partially covering the container opening 18, wherein the collector inlet 40 is disposed in fluid communication with the container space 16 through the container opening 18 when the lid 14 is disposed in the operative position such that the lid passage 38 provides a passage for entry of environmental precipitation into the container space 16.

In some embodiments, for example, the lid 14 is coupled to the container 12 and partially covering the container opening 18, and the collector inlet 40 is disposed in fluid communication with the container space 16 through the container opening 18 such that the lid passage 38 provides a passage for entry of environmental precipitation into the container space 16. In some of these embodiments, for example, the lid 14 is coupled to a rim 42 of the container 12 with one or more fasteners. For example, the lid 14 is coupled to the rim 42 with screws 44.

In some embodiments, for example, the lid 14 is positionable relative to the container 12 to an operative position for partially covering the container opening 18, wherein the collector inlet 40 is disposed in fluid communication with the container space 16 through the container opening 18 when the lid 14 is disposed in the operative position such that the lid passage 38 provides a passage for entry of environmental precipitation into the container space 16. In this respect, in some embodiments, for example, the lid 14 is configured for coupling to a rim 42 of the container 12 with one or more fasteners (such as screws 44) to assume the operative position.

In some embodiments, for example, a lid upper surface portion 46 extends from the periphery 48 of the lid passage 38 and is sloped downwardly towards the lid passage 38 so as to facilitate flow of precipitation collected on the lid upper surface portion 46 towards the lid passage 38.

In some embodiments, for example, a filter element 50 extends across the lid passage 38. The filter element 50 mitigates the ingress of solid matter into the container space 16. For example, a suitable filter element 50 includes a mesh. For example, in some embodiments, the filter element includes 16×16 per inch stainless steel mesh with a wire diameter of 0.0180 inch, with a rim (for example, made of plastic or aluminum) joined to the mesh and extending about the perimeter of the mesh.

In some embodiments, for example, the lid 14 includes a lip 52 extending about the periphery 48 of the lid upper surface portion 46, thereby containing precipitation collected on the lid upper surface portion 46 so as to mitigate movement of the collected precipitation over the peripheral edge 54 of the lid 14.

In some embodiments, for example, the valve 21 is 45-degree garden faucet or "bib-cock".

In some embodiments, for example, the material of one of, or each of, the container 12 and the lid 14 is plastic. For example, suitable plastics include polyethylene or polyvinyl chloride. For example, one of, or each of, the container 12 and the lid is injection molded.

The kit additionally includes any one of, or any combination of, the following aspects, including described exemplary embodiments of the following aspects.

B1. Kit for Assembling a Precipitation Collector Including Novel Disposition of Overflow Outlet There is provided aspects relating to the disposition of the overflow of the container 112.

Figure 23:
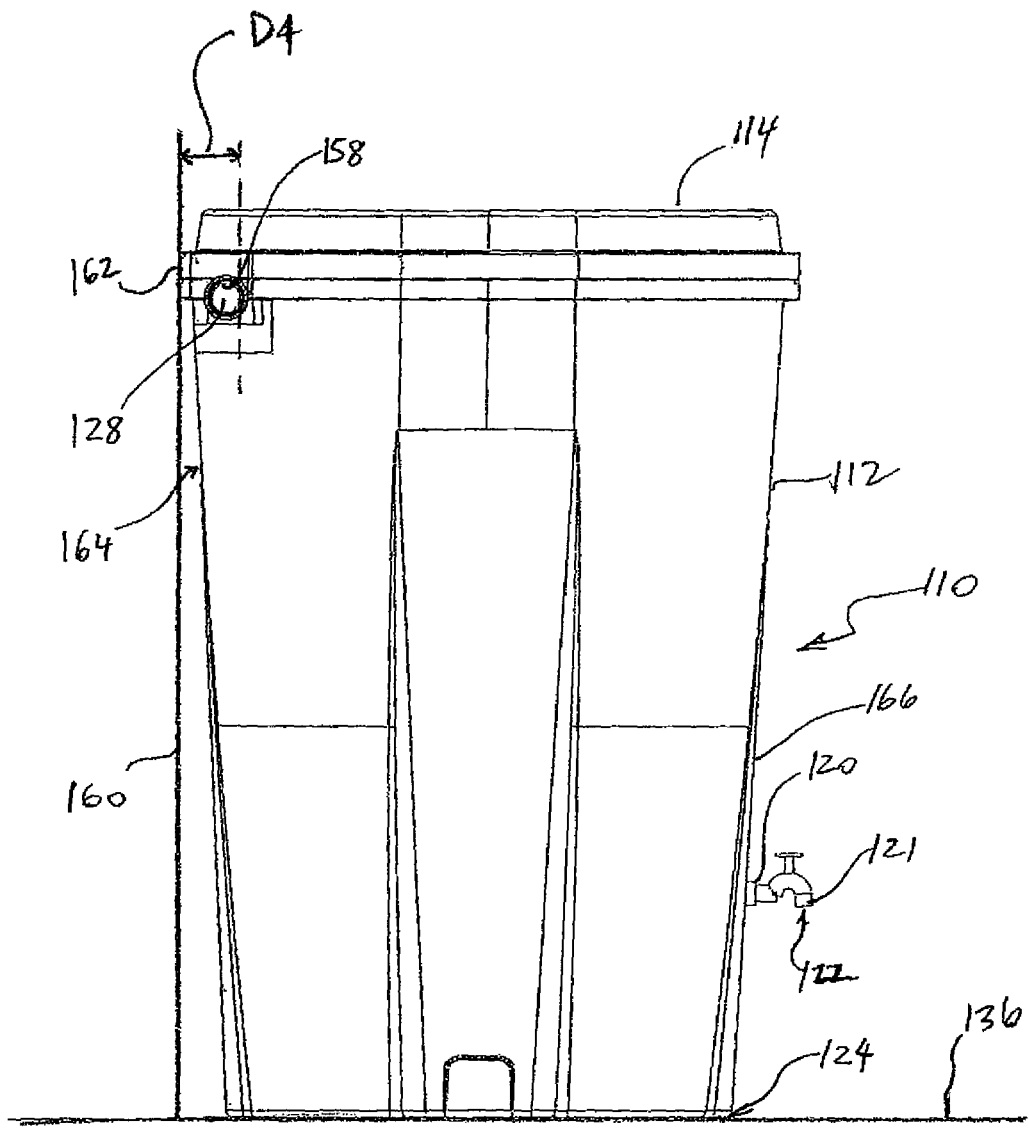
FIG. 23 is another side elevation view of the kit of FIG. 18, illustrating the dimension D4.
Figure 24:
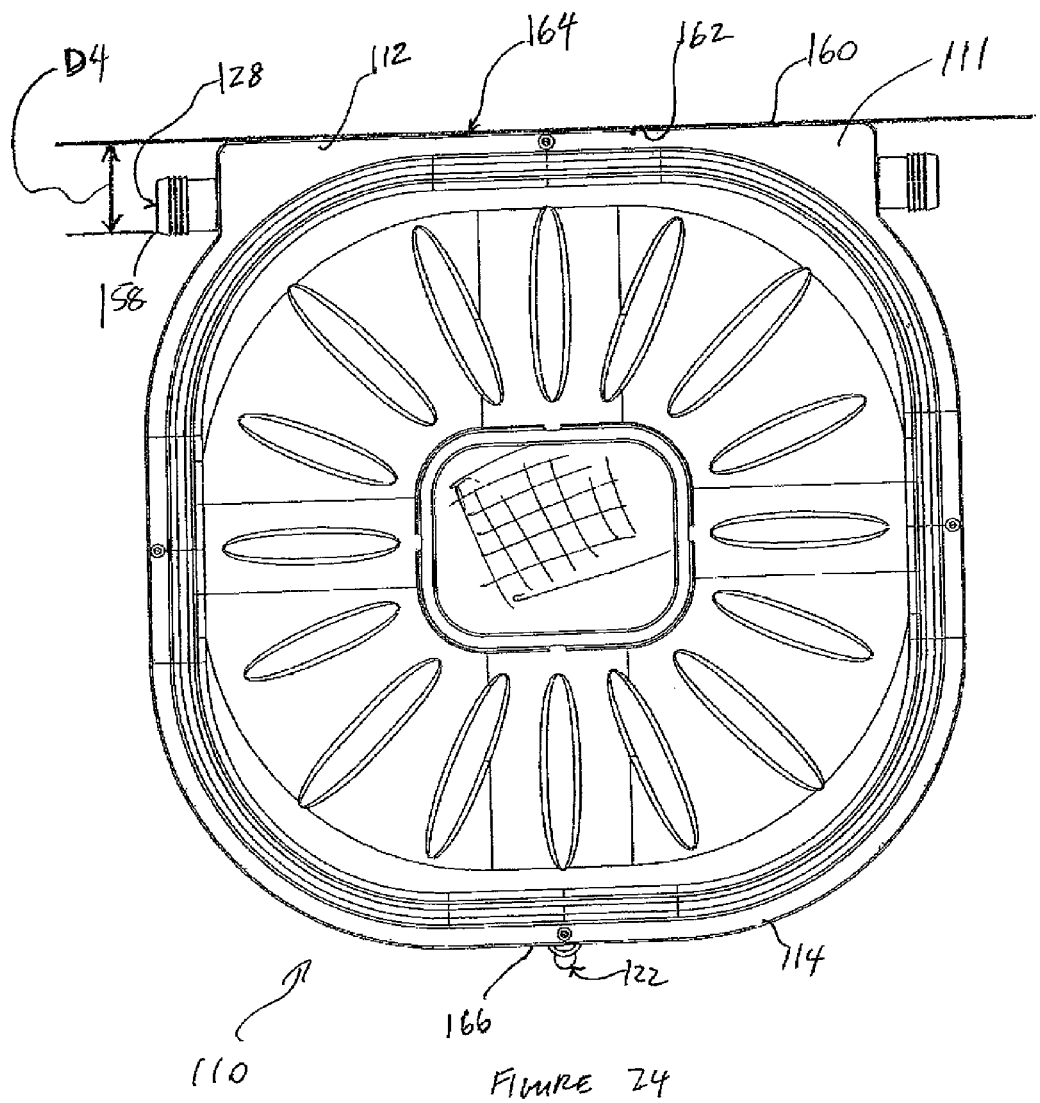
FIG. 24 is another top plan view of the kit of FIG. 18, illustrating the dimension D4.

In this respect, and referring to FIGS. 23 and 24, in one aspect, the overflow outlet 28 of the container 112 is configured for discharging an overflow of the received precipitation collected within the container space 16. An edge of the perimeter 58 of the overflow outlet 28, disposed furthest from a reference vertical plane 60 tangent to an operative outermost external surface portion 62 of the container 112, is disposed at a minimum distance D4 of less than six (6) inches from the reference vertical plane 60 when the operative outermost external surface portion 62 is positioned adjacent to the reference vertical plane 60 when the collector 10 is supported on a horizontal reaction surface 36. For example, in some embodiments, the edge of the perimeter 58 is disposed 2.5 inches from the reference vertical plane 60 when the operative outermost external surface portion 62 is positioned adjacent to the reference vertical plane 60 when the collector 10 is supported on a horizontal reaction surface 36. The operative outermost external surface portion 62 is disposed on an operative external surface portion 64 of the collector 10. The operative external surface portion 64 of the collector 10 is that portion of the external surface of the collector 10 which is opposite from the external surface portion 66 at which the discharge outlet 20 is disposed. The operative outermost external surface portion is a portion 62 of the operative external surface portion 64 which extends furthest outwardly relative to other portions of the operative external surface portion 64 when the collector 10 is supported on a horizontal reaction surface 36.

Figure 25:
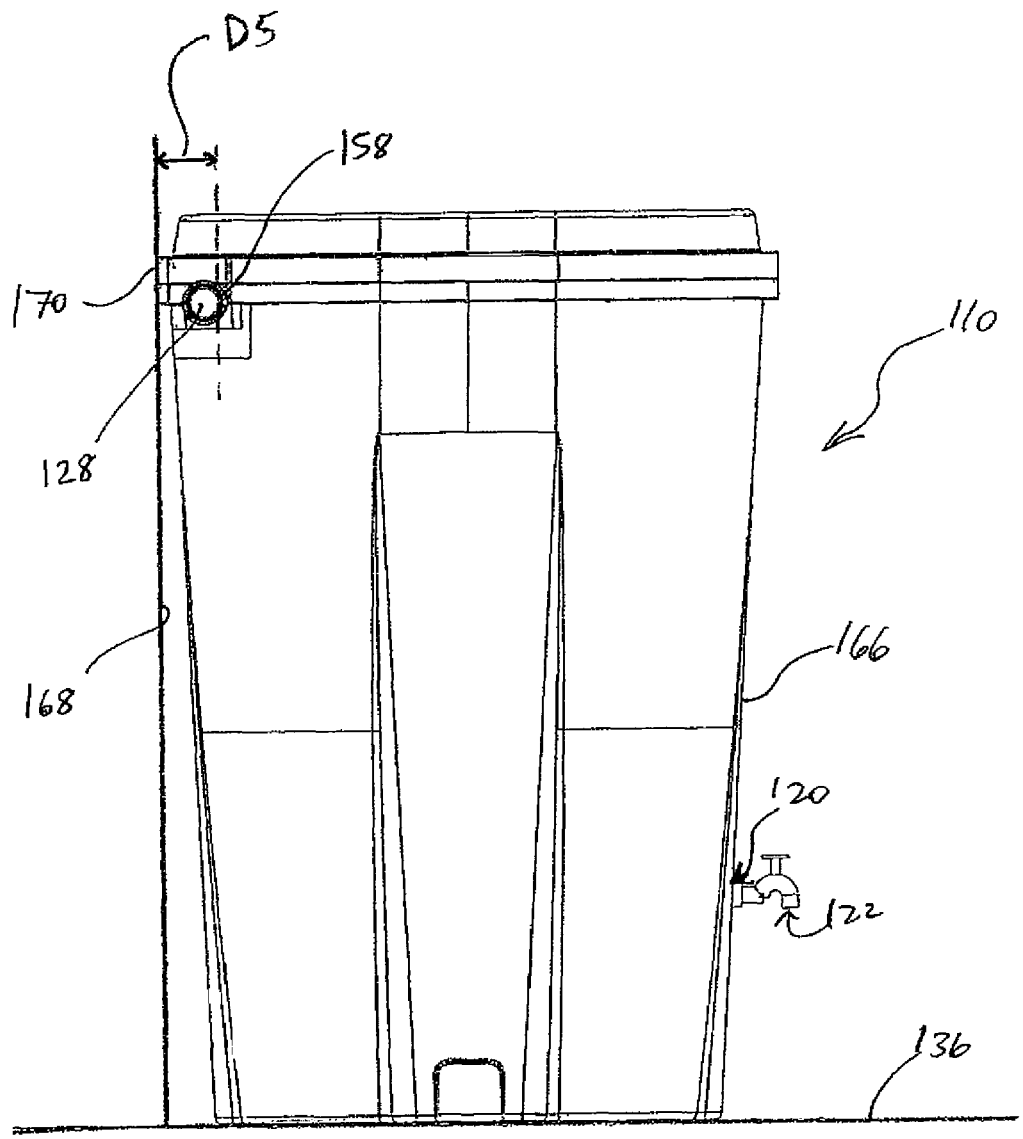
FIG. 25 is another side elevation view of the kit of FIG. 18, illustrating the dimension D5.
Figure 26:
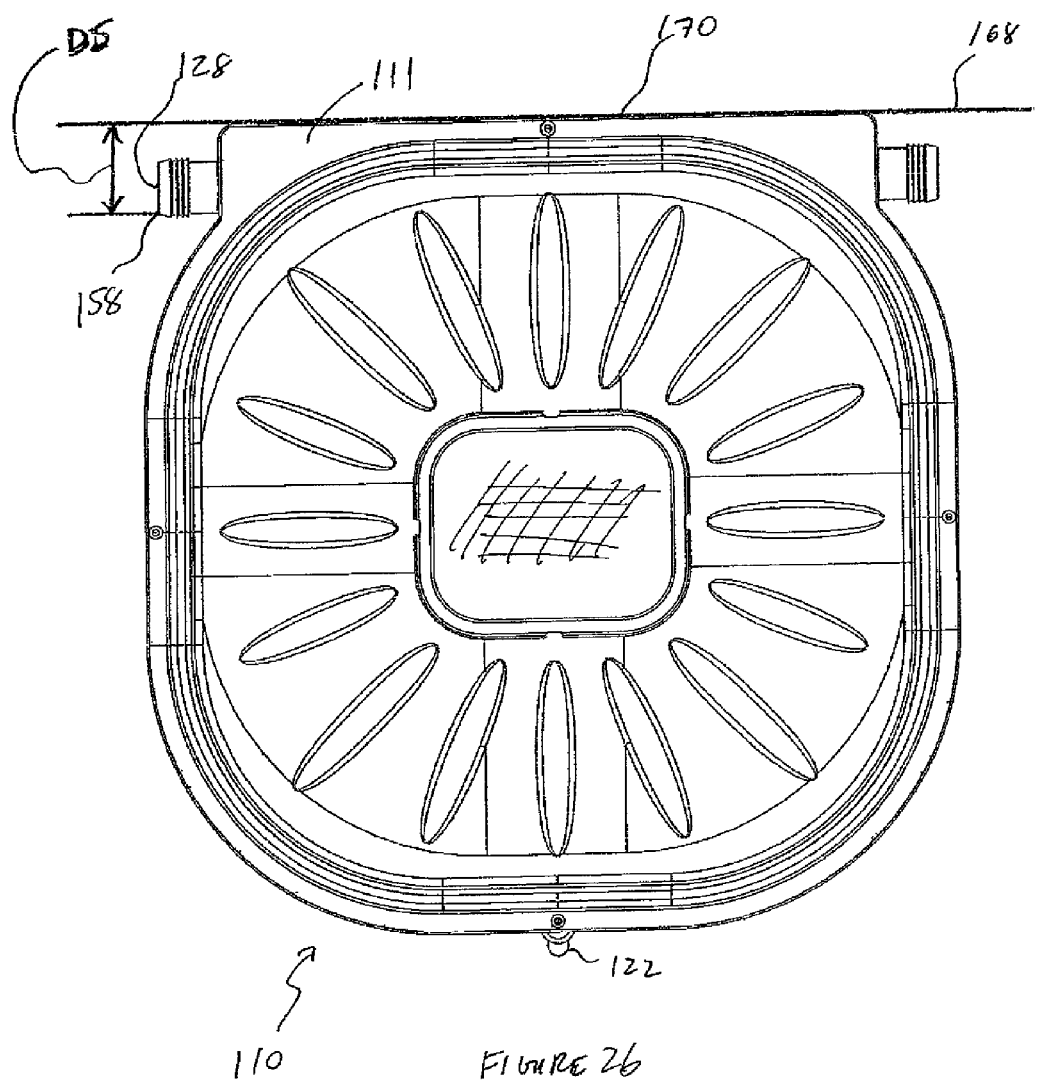
FIG. 26 is another top plan view of the kit of FIG. 18, illustrating the dimension D5.

In another related aspect, and referring to FIGS. 25 and 26, the overflow outlet 28 of the container 112 is configured for discharging an overflow of the received precipitation collected within the container space 16. An edge of the perimeter 58 of the overflow outlet 28, disposed furthest from an operative planar vertical surface 68, is disposed at a minimum distance D5 of less than six (6) inches from the operative planar vertical surface 68 when a position-operative exterior surface portion 70 of the collector 10 is positioned adjacent to the operative planar vertical surface 68 when the collector 10 is supported on a horizontal reaction surface 36. For example, in some embodiments, the edge of the perimeter 58 is disposed 0.5 inches from the operative planar vertical surface 68 when a position-operative exterior surface portion 70 of the collector 10 is positioned adjacent to the operative planar vertical surface 68 when the collector 10 is supported on a horizontal reaction surface 36. The position-operative external surface portion 64 is a portion of the external surface 11 of the collector 10 which is opposite from the external surface portion of the container 112 at which the discharge outlet 20 is disposed.

In some embodiments of a precipitation collector 10 including either one of the above-described aspects, for example, the operative outermost external surface portion 62 is a portion of a substantially planar surface portion 72 which is contiguous to the reference vertical plane 60 when the collector 10 is supported on a horizontal reaction surface 36. In some of these embodiments, for example, the substantially planar surface portion 72 includes a length of at least ten (10) inches. For example, in some embodiments, the length is twenty (20) inches.

Figure 27:
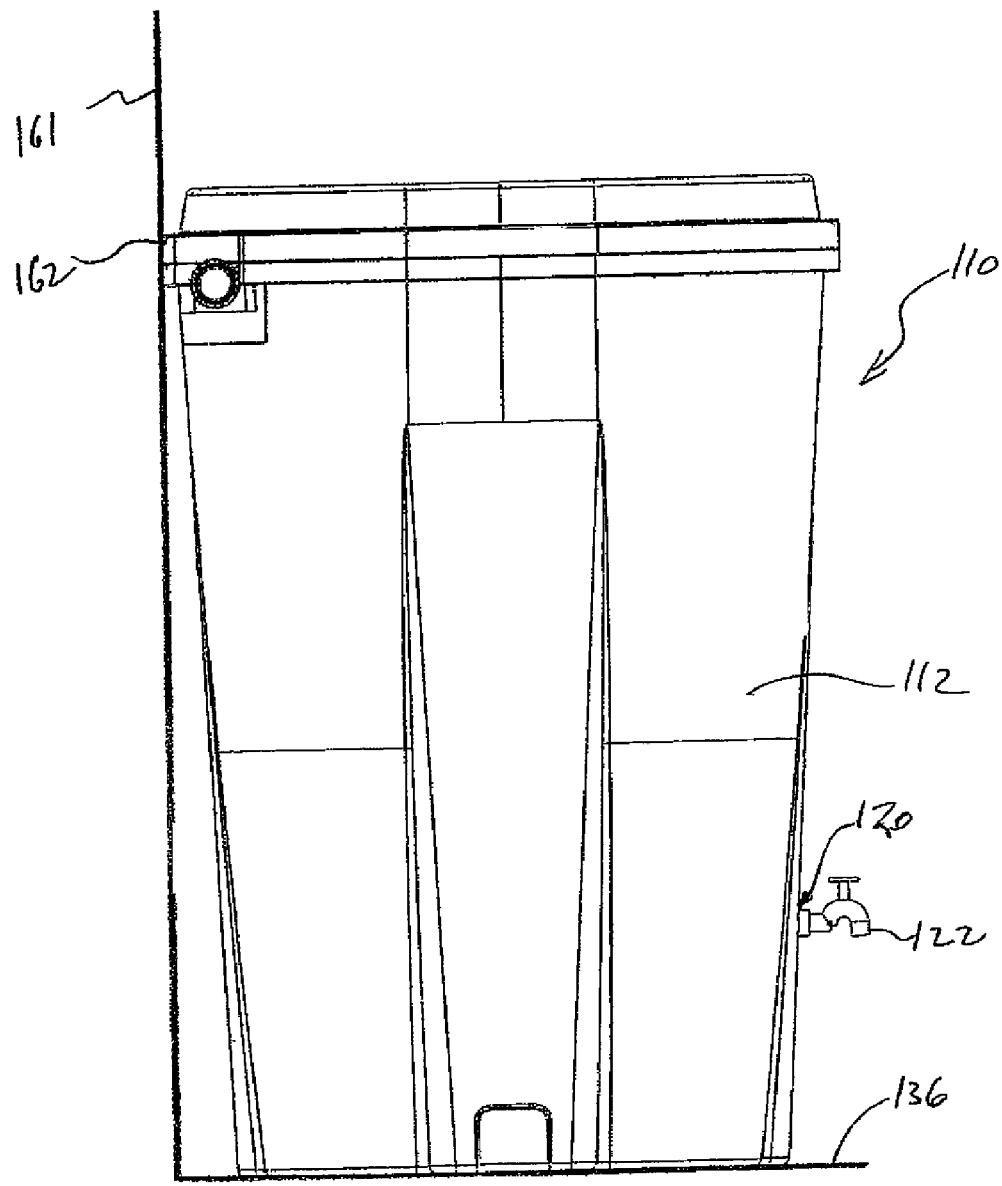
FIG. 27 is another side elevation view of the kit of FIG. 18, illustrating a relationship between the kit of FIG. 18 and a reference planar vertical surface.
Figure 28:
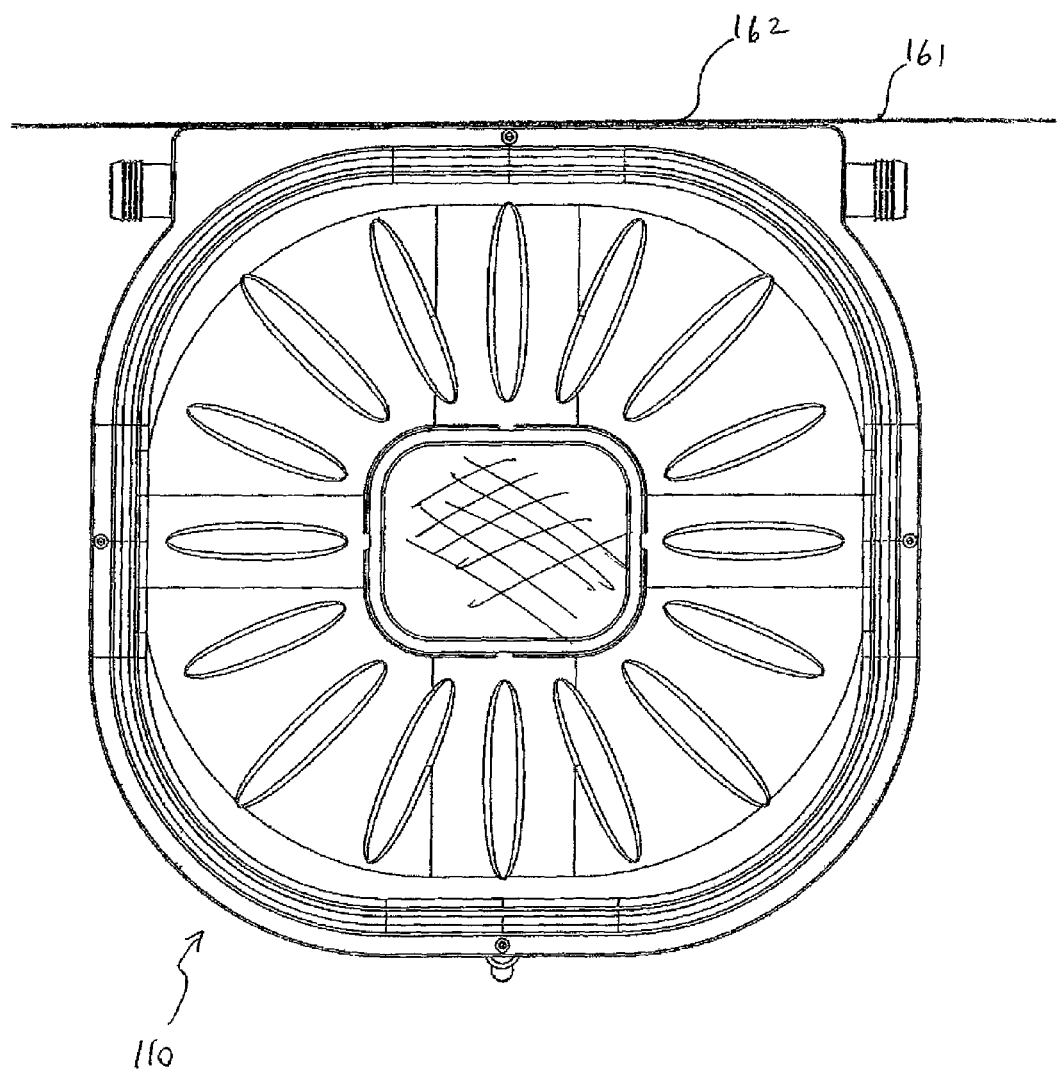
FIG. 28 is another top plan view of the kit of FIG. 18, illustrating a relationship between the kit of FIG. 18 and a reference planar vertical surface.
Figure 29:
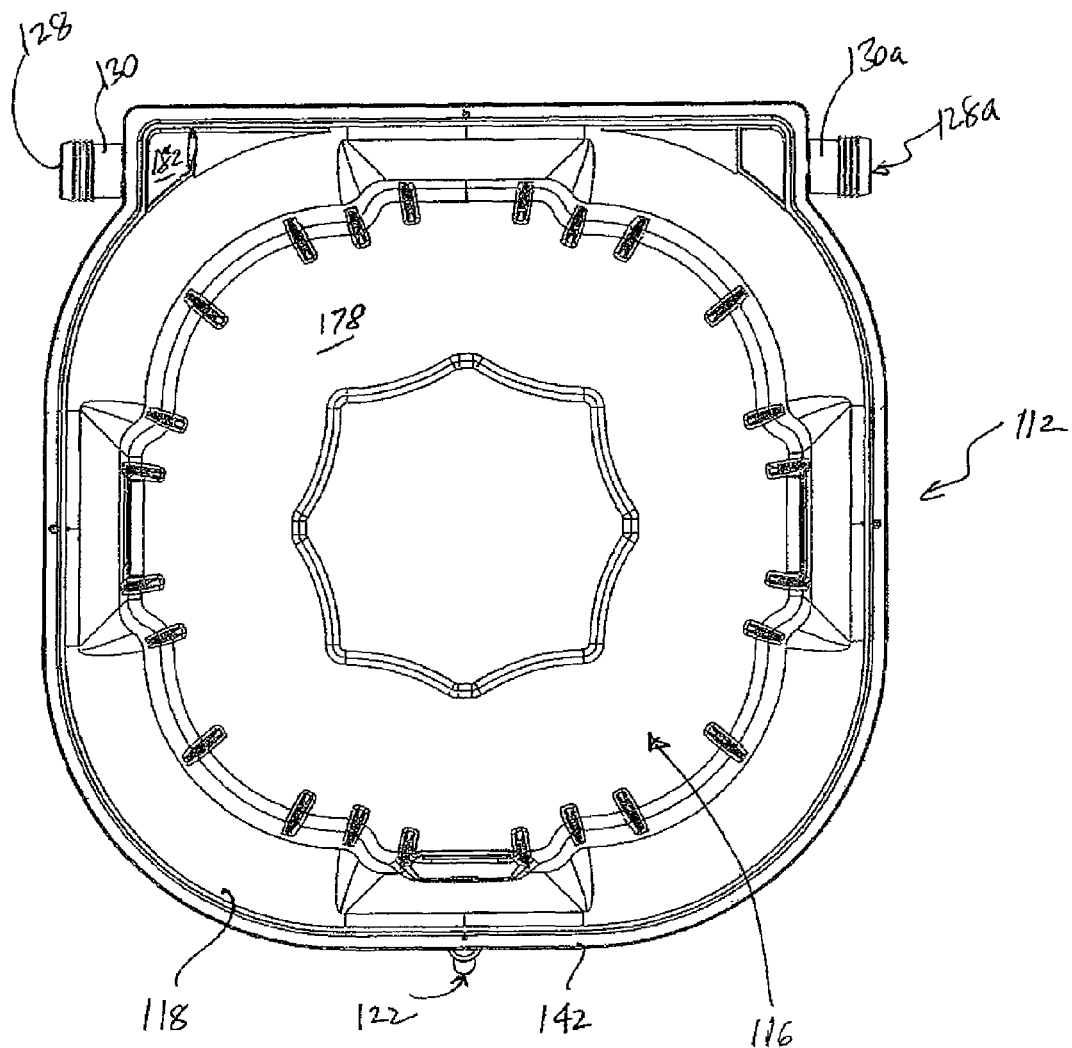
FIG. 29 is a top plan view of a container of the kit of FIG. 18.
Figure 30:
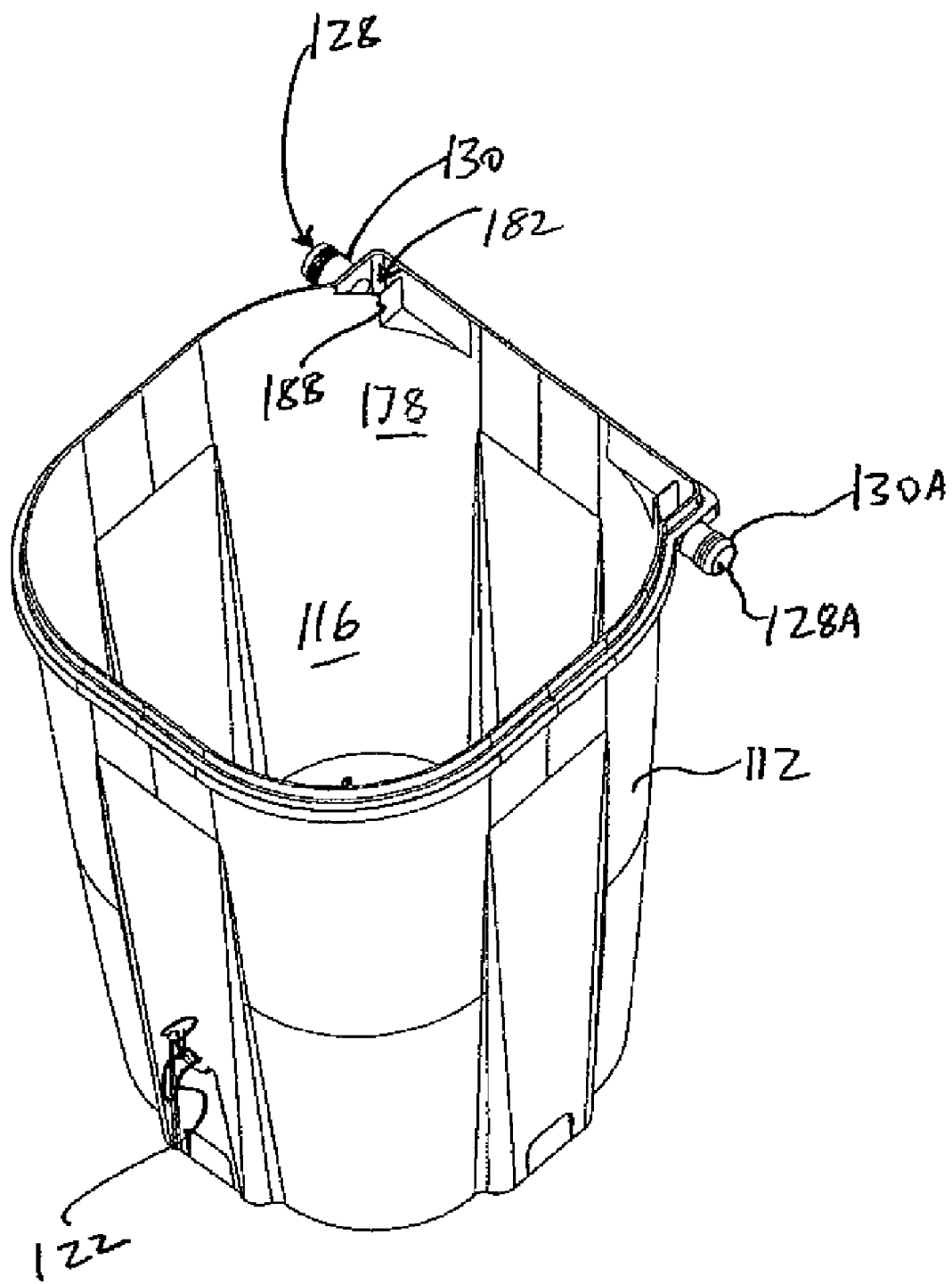
FIG. 30 is a top perspective view of a container of the kit of FIG. 18.
Figure 31:
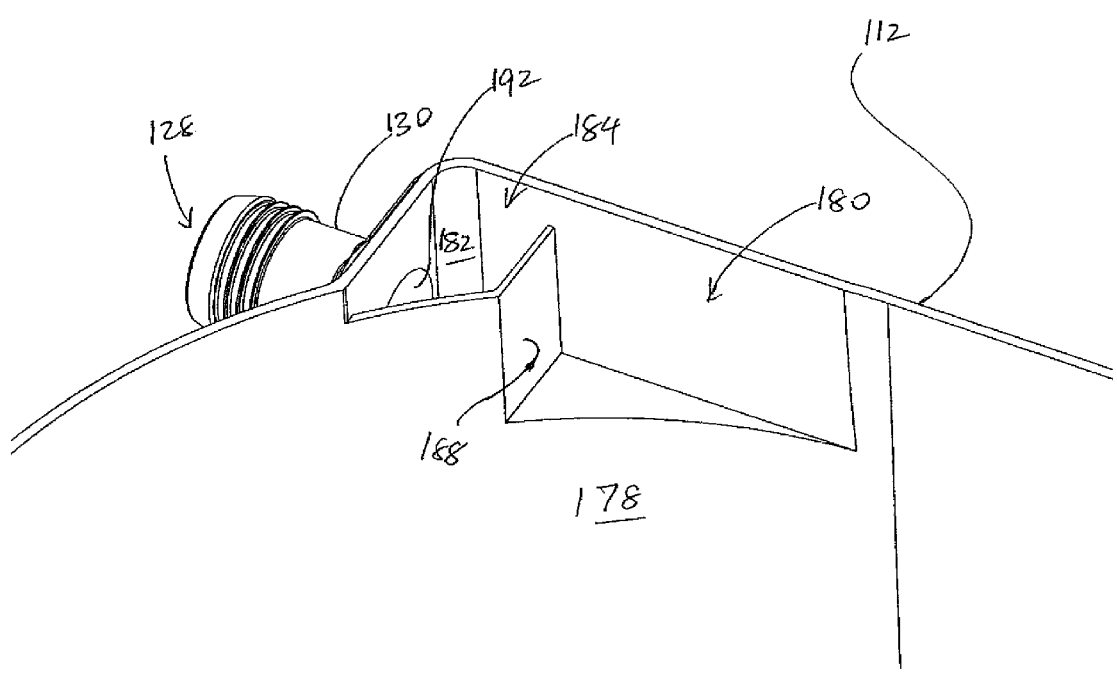
FIG. 31 is a top perspective view of a section of the container of FIG. 13, illustrating an overflow compartment of the kit of FIG. 18.
Figure 32:
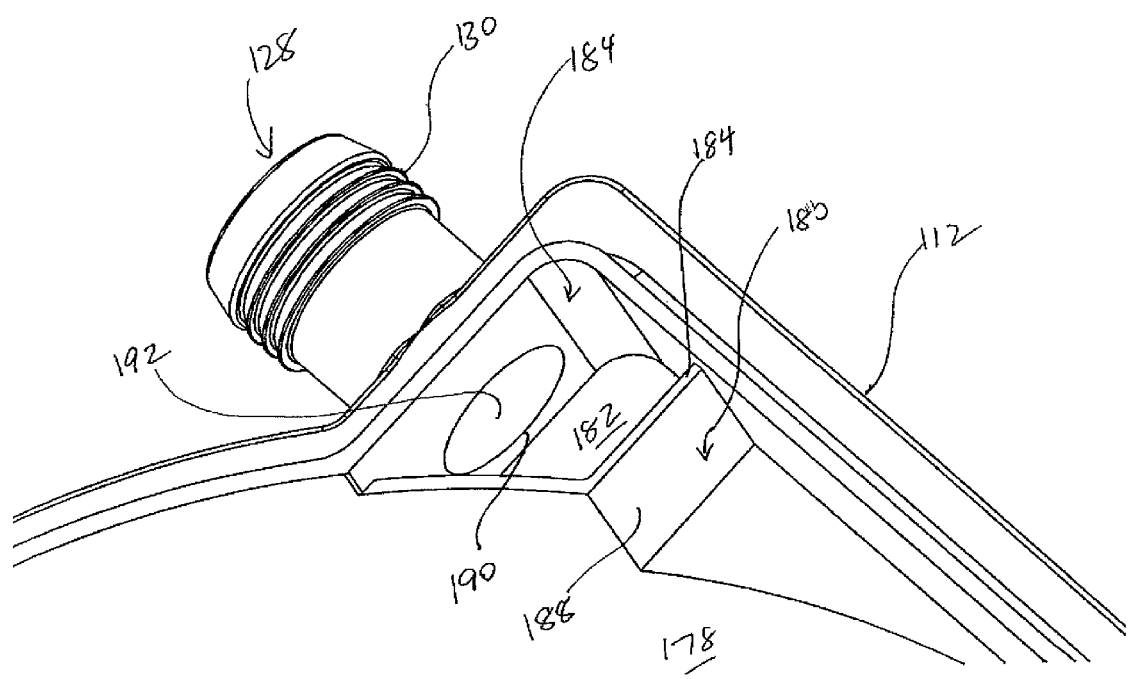
FIG. 32 is another top perspective view of a section of the container of FIG. 13, illustrating an overflow compartment of the kit of FIG. 18.
Figure 33:
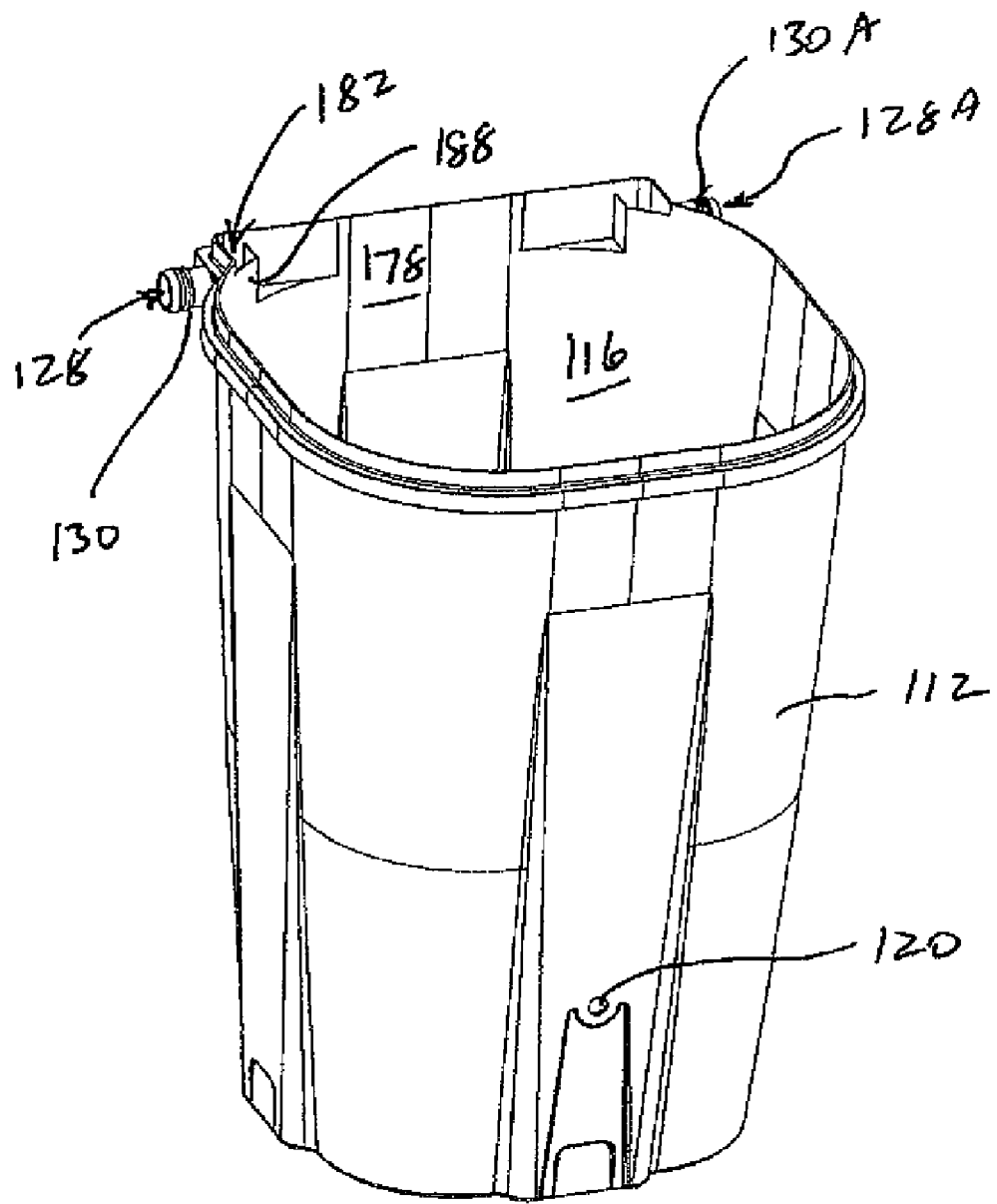
FIG. 33 is a top perspective view of a container of the kit of FIG. 17.
Figure 34:
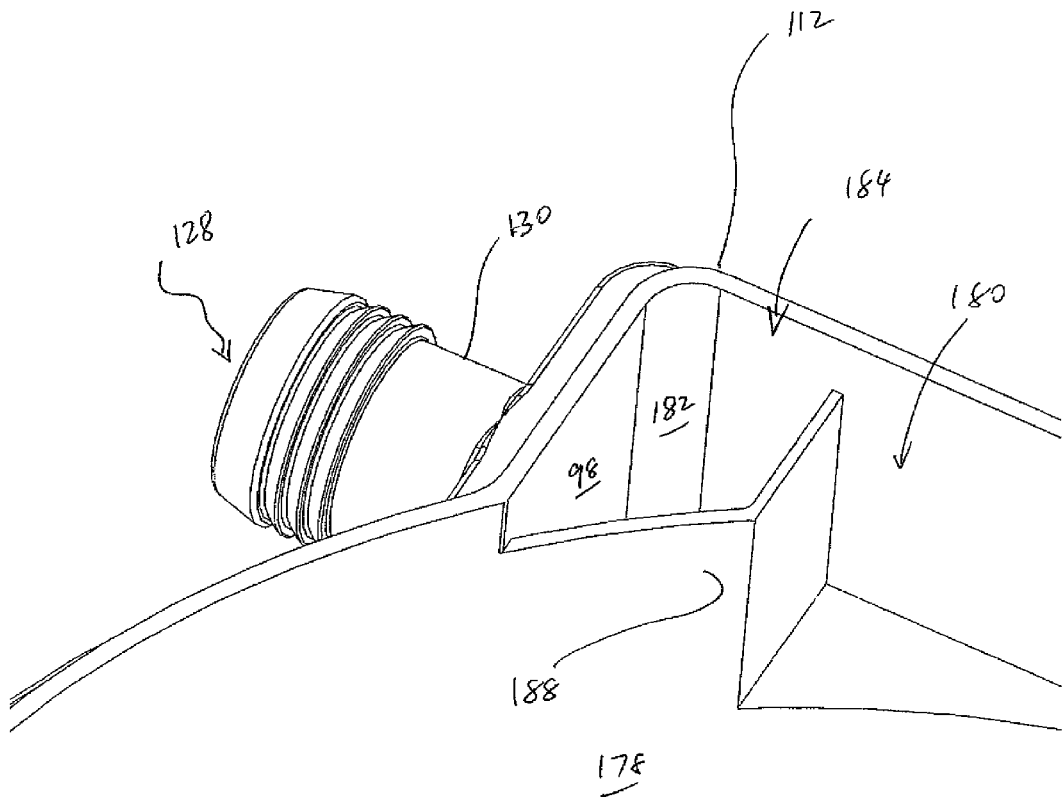
FIG. 34 is a top perspective view of a section of a container of another embodiment of a kit for assembling a precipitation collector, illustrating an outlet-creating portion of an overflow compartment of the container, which is configured for separation from the container.
Figure 35:
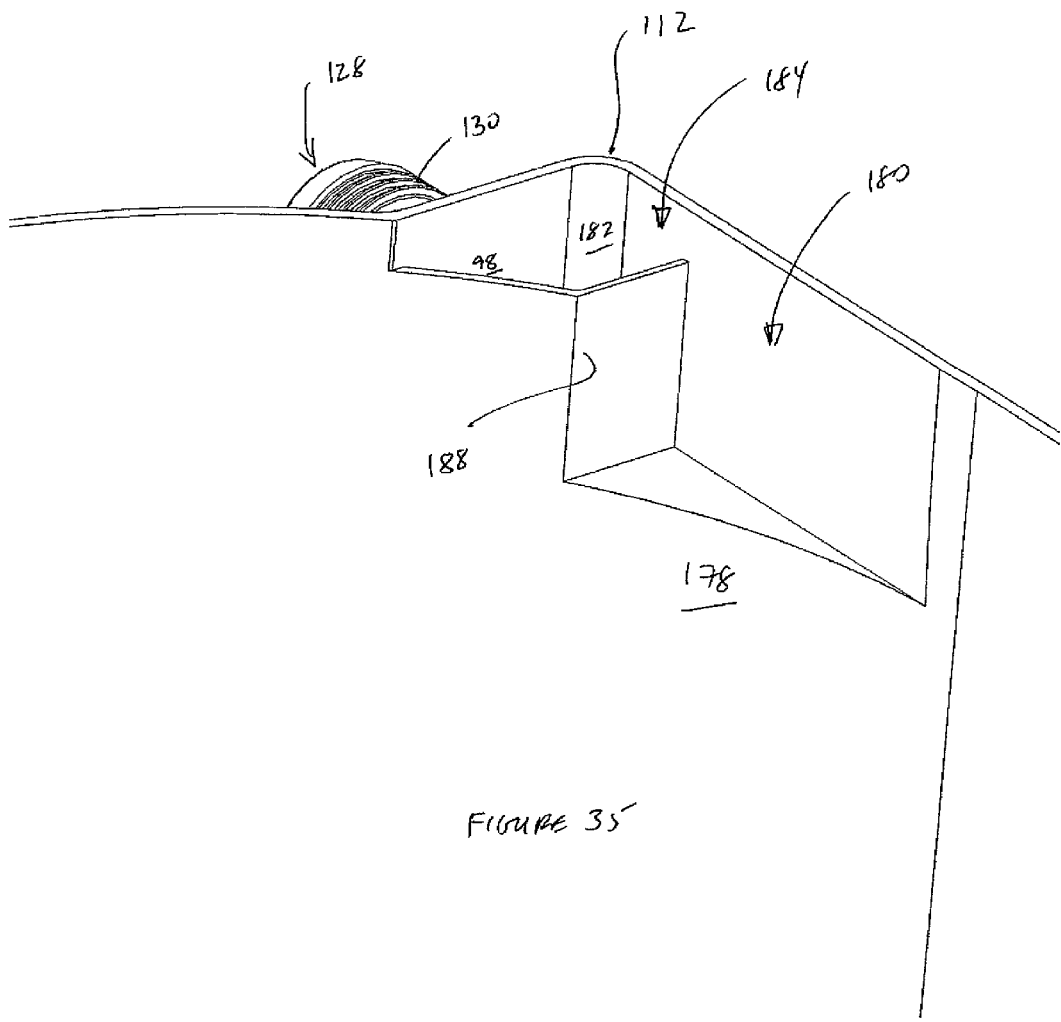
FIG. 35 is another top perspective view of a section of the container of FIG. 34, illustrating an outlet-creating portion of an overflow compartment of the container, which is configured for separation from the container.

In some embodiments of a precipitation collector 10 including either one of the above-described aspects, for example, and referring to FIGS. 27 and 28, the operative outermost external surface portion 62 of the container 112 is shaped to co-operate with a planar vertical surface 61 such that the collector 10 is positionable so that the operative outermost external surface portion is disposed contiguous to the planar vertical surface 61 when the container 112 is supported on a horizontal reaction surface 36.

B2. Kit for Assembling a Precipitation Collector Including a Flexible Conduit

There is provided an aspect relating to the directing of overflow from the container 112 of the precipitation collector 10.

Figure 16:
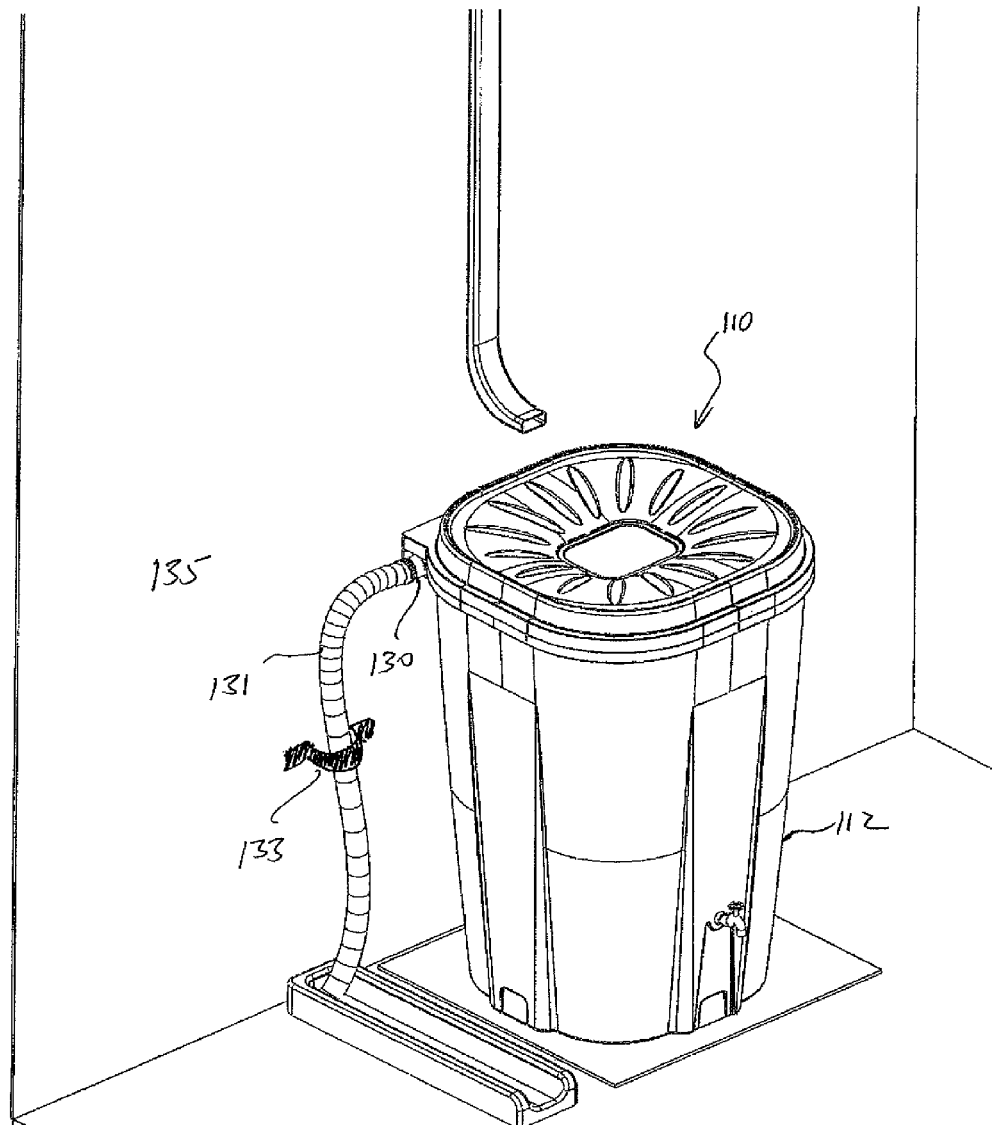
FIG. 16 is a top perspective view of a system including an embodiment of a precipitation collector.

In this respect, and referring to FIG. 16, there is further provided a flexible conduit 31 coupled to, or configured for fluid coupling to, the overflow outlet 28. The flexible conduit 31 is provided to direct the overflow to a desirable location. In some embodiments, for example, the flexible conduct 31 is a 1.5 inch inside diameter corrugated plastic pipe. For example, suitable plastics includes polypropylene or polyvinylchloride.

There is also provided instructions for effecting connection of a clamp 33 (such as, for example, a C-clamp) to a wall 35, fluid coupling of the flexible conduit 31 to the overflow outlet 28, and co-operation between the clamp 33 and the flexible conduit 31 so as to effect coupling of the flexible conduit 31 to the wall 35. Optionally, there is also provided a clamp 33 with fasteners for effecting connection of the clamp 33 to the wall. In this respect, a hose clamp is slid over the flexible conduct 31, and the assembly is fitted over the overflow outlet 28. The hose clamp is then tightened to effect a more robust connection to the overflow outlet 28. The flexible conduit 31 is then secured to a structure, such as the wall 35, by the clamp 33. By effecting coupling of the flexible conduit 31 to the wall 35, the flexible conduit 31 can become disposed in a position which does not interfere with traffic about the collector 10.

B3. Kit for Assembling a Precipitation Collector with Overflow Compartment

Referring to FIGS. 29 to 35, another aspect of the kit which is provided is a container 112 with separate overflow and precipitation containment compartments 84, 80. The overflow compartment 84 enables the container 112 to receive and contain a larger volume of precipitation, before capacity is exceeded and the collected precipitation overflows the container 112. This is because, with a separate overflow containment compartment 84, the liquid level in the precipitation containment compartment 80 is permitted to closer approach the top of the container 112 before being directed to an overflow outlet 28.

In this respect, the container space 16 includes a precipitation containment compartment space 78 provided in a precipitation containment compartment 80 and an overflow containment compartment space 82 provided in an overflow containment compartment 84. The precipitation containment compartment 80 is configured to receive precipitation through a container opening 18. The overflow containment compartment space 82 is configured for receiving an overflow of precipitation from the precipitation containment compartment 80. The overflow fluid passage 86 is disposed in fluid communication with the overflow containment compartment space 82 for effecting discharge of precipitation collected within the overflow containment compartment space 82 through the overflow outlet 28. In those embodiments with two overflow outlets 28, 28a, a corresponding overflow compartment 84 may be provided for each of the outlets 28, 28a.

In some embodiments of a precipitation collector 10 including separate overflow and precipitation containment compartments 84, 80, for example, the overflow fluid passage 86 extends from the overflow containment compartment space 82.

In some embodiments of a precipitation collector 10 including separate overflow and precipitation containment compartments 84, 80, for example, the overflow containment compartment space 82 is separated from the precipitation containment compartment 80 by a weir 88. The overflow of precipitation from the precipitation containment compartment 80 is effected when the level of the precipitation within the container 112 exceeds the height of the weir 88.

In some embodiments of a precipitation collector 10 including separate overflow and precipitation containment compartments 84, 80, the overflow fluid passage 86 extends from the overflow containment compartment space 82 through a container wall overflow fluid passage-defining portion 92. The lowermost edge 90 of the container wall overflow fluid passage-defining portion 92 is disposed below the upper edge 94 of the weir 88 when the base of the collector 10 is supported on a substantially horizontal reaction surface 36. For example, when the base 24 of the collector 10 is supported on a substantially horizontal reaction surface 36, the lowermost edge 90 of the container wall overflow fluid passage-defining portion 92 is disposed below the upper edge 94 of the weir 88 by a minimum distance of at least 0.75 inches. As another example, when the base 24 of the collector 10 is supported on a substantially horizontal reaction surface 36, the lowermost edge 90 of the container wall overflow fluid passage-defining portion 92 is disposed below the upper edge 94 of the weir 88 by a minimum distance of at least 1.75 inches.

In some embodiments of a precipitation collector 10 including separate overflow and precipitation containment compartments 84, 80, for example, the precipitation containment compartment 80 is positioned to receive precipitation through the container opening 18.

In some embodiments of a precipitation collector 10 including separate overflow and precipitation containment compartments 84, 80, for example, the precipitation containment compartment 80 is disposed in alignment with the lid passage 38.

In some embodiments, for example, the overflow fluid passage 86 includes a minimum cross-sectional area of at least 1.2 square inches. In some embodiments, for example, the overflow fluid passage 86 includes a minimum cross-sectional area of between 1.2 square inches and 3.0 square inches In some embodiments, for example, the overflow fluid passage 86 includes a minimum cross-sectional area of 1.7 square inches.

In the above description, for purposes of explanation, numerous details are set forth in order to provide a thorough understanding of the present disclosure. However, it will be apparent to one skilled in the art that these specific details are not required in order to practice the present disclosure. Although certain dimensions and materials are described for implementing the disclosed example embodiments, other suitable dimensions and/or materials may be used within the scope of this disclosure. All such modifications and variations, including all suitable current and future changes in technology, are believed to be within the sphere and scope of the present disclosure. All references mentioned are hereby incorporated by reference in their entirety.

The invention claimed is:

1. A precipitation collector, comprising:
a container including a container space configured for containing precipitation received through a container opening, wherein the container includes a discharge outlet fluidly coupled to a valve to define selectively operable outlet of the collector for selectively discharging the received precipitation which has been collected within the container space; and
a lid partially covering the container opening, wherein the lid includes a lid passage which defines a collector inlet disposed in fluid communication with the container space through the container opening such that the lid passage provides a passage for entry of environmental precipitation into the container space;
wherein the container includes an overflow outlet configured for discharging an overflow of the received precipitation collected within the container space, wherein an edge of the perimeter of the overflow outlet, disposed furthest from a reference vertical plane tangent to an operative outermost external surface portion of the collector, is disposed at a minimum distance of less than six (6) inches from the reference vertical plane when the operative outermost external surface portion is positioned adjacent to the reference vertical plane when the collector is supported on a horizontal reaction surface;
and wherein the operative outermost external surface portion is disposed on an operative external surface portion of the collector, and wherein the operative external surface portion of the collector is that portion of the external surface which is opposite from the external surface portion at which the selectively operable discharge outlet is disposed, and wherein the operative outermost external surface portion is a portion of the operative external surface portion which extends furthest outwardly relative to other portions of the operative external surface portion when the collector is supported on a horizontal reaction surface.

2. The precipitation collector as claimed in claim 1;
wherein the operative outermost external surface portion is a portion of a substantially planar surface portion which is contiguous to the reference vertical plane when the container is supported on a horizontal reaction surface.

3. The precipitation collector as claimed in claim 1;
wherein the overflow outlet includes an axis which is transverse to an operative outermost external surface portion-reference vertical plane, wherein the operative outermost external surface portion-reference vertical plane is orthogonal to the operative outermost external surface portion.

4. The precipitation collector as claimed in claim 1;
wherein the operative outermost external surface portion of the collector is shaped to co-operate with a planar vertical surface such that the collector is positionable so that the operative outermost external surface portion is disposed contiguous to the planar vertical surface when the collector is supported on a horizontal reaction surface.

5. The precipitation collector as claimed in claim 1; wherein the overflow outlet is defined by an overflow conduit structure extending from an external surface of the container.

6. The precipitation collector as claimed in claim 1; wherein the axis of the overflow outlet is disposed a minimum distance of at least twenty (20) inches above the base of the collector when the base is supported on a reaction surface.

7. A kit for assembly of a precipitation collector, comprising:
a container including a container space configured for containing precipitation received through a container opening, wherein the container includes a discharge outlet; wherein either:
  (a.1) a selectively operable outlet for selectively discharging precipitation which has been received within the container space is defined by a valve fluidly coupled to the discharge outlet; or
  (a.2) a valve is provided and configured for fluid coupling to the container to thereby co-operate with the discharge outlet such that the valve is operable to effect selective discharge, through the discharge outlet, of received precipitation which has been collected within the container space; and
a lid including a lid passage which defines a collector inlet, wherein the lid is either:
  (a) coupled to the container and partially covering the container opening, and the collector inlet is disposed in fluid communication with the container space through the container opening such that the lid passage provides a passage for entry of environmental precipitation into the container space; or
  (b) positionable relative to the container to an operative position for partially covering the container opening, wherein the collector inlet is disposed in fluid communication with the container space through the container opening when the lid is disposed in the operative position such that the lid passage provides a passage for entry of environmental precipitation into the container space;
wherein the container includes an overflow outlet, or an outlet-creating portion configured for separation from the container to effect fluid communication between the container space and an overflow outlet, wherein the overflow outlet is configured for discharging an overflow of the received precipitation which has been collected within the container space, wherein an edge of the perimeter of the overflow outlet, disposed furthest from a reference vertical plane tangent to an operative outermost external surface portion of the collector, is disposed at a minimum distance of less than six (6) inches from the reference vertical plane when the operative outermost external surface portion is positioned adjacent to the reference vertical plane when the collector is supported on a horizontal reaction surface;
and wherein the operative outermost external surface portion is disposed on an operative external surface portion of the collector, and wherein the operative external surface portion of the collector is that portion of the external surface which is opposite from the external surface portion at which the discharge outlet is disposed, and wherein the operative outermost external surface portion is a portion of the operative external surface portion which extends furthest outwardly relative to other portions of the operative external surface portion when the collector is supported on a horizontal reaction surface.

8. The kit as claimed in claim 7; wherein the outlet-creating portion is defined by a weakened portion of the container and is configured for separation from the container by applying a pressing force to the weakened portion.

9. The kit as claimed in claim 8; wherein the weakened portion includes a perimeter whose wall thickness is thinner relative to a container portion disposed peripherally of the perimeter.

10. A kit for assembly of a precipitation collector device, comprising:
a container including a container space configured for containing precipitation received through a container opening, wherein the container includes a discharge outlet, and wherein the container includes an overflow outlet, or an outlet-creating portion configured for separation from the container to effect fluid communication between the container space and an overflow outlet, wherein the overflow outlet is configured for discharging an overflow of the received precipitation which has been collected within the container space, wherein either:
  (a.1) a selectively operable outlet for selectively discharging precipitation which has been received within the container space is defined by a valve fluidly coupled to the discharge outlet; or
  (a.2) a valve is provided and configured for fluid coupling to the container to thereby co-operate with the discharge outlet such that the valve is operable to effect selective discharge, through the discharge outlet, of received precipitation which has been collected within the container space;
a lid including a lid passage which defines a collector inlet, wherein the lid is either:
  (b.1) coupled to the container and partially covering the container opening, and the collector inlet is disposed in fluid communication with the container space through the container opening such that the lid passage provides a passage for entry of environmental precipitation into the container space; or
  (b.2) positionable relative to the container to an operative position for partially covering the container opening, wherein the collector inlet is disposed in fluid communication with the container space through the container opening when the lid is disposed in the operative position such that the lid passage provides a passage for entry of environmental precipitation into the container space;
a flexible conduit coupled to, or configured for fluid coupling to, the overflow outlet; and
instructions for effecting connection of a clamp to a wall, fluid coupling of the flexible conduit to the overflow outlet, and co-operation between the clamp and the flexible conduit so as to effect coupling of the flexible conduit to the wall.

11. The kit as claimed in claim 10; further comprising a clamp configured for connection to a wall, such that, when the clamp is connected to a wall, the clamp co-operates with the wall to define space for receiving insertion of the flexible conduit, and when the flexible conduit extends through the space, the flexible conduit is disposed in a coupling relationship with the wall.

12. A precipitation collector, comprising:
a container including a container space, wherein the container space includes a precipitation containment compartment space provided in a precipitation containment compartment and an overflow containment compartment space provided in an overflow containment compartment, wherein the precipitation containment compartment is configured to receive precipitation through a container opening, and wherein the overflow containment compartment space is configured for receiving an overflow of precipitation from the precipitation containment compartment, and wherein the container includes a selectively operable outlet for selectively discharging precipitation which has been collected within the precipitation containment compartment;
a lid partially covering the container opening, wherein the lid includes a lid passage which defines a collector inlet disposed in fluid communication with the container space through the container opening such that the lid passage provides a passage for entry of environmental precipitation into the container space;
wherein the container includes an overflow fluid passage disposed in fluid communication with the overflow containment compartment space for effecting discharge of precipitation collected within the overflow containment compartment space through an outlet.

13. The precipitation collector as claimed in claim 12;
wherein the overflow fluid passage extends from the overflow containment compartment space.

14. The precipitation collector as claimed in claim 12;
wherein the overflow containment compartment space is separated from the precipitation containment compartment by a weir, and wherein the overflow of precipitation from the precipitation containment compartment is effected when the level of the precipitation within the container exceeds the height of the weir.

15. The precipitation collector as claimed in claim 14;
wherein the overflow fluid passage extends from the overflow containment compartment space through a container wall overflow fluid passage-defining portion, wherein the lowermost edge of the container wall overflow fluid passage-defining portion is disposed below the upper edge of the weir when the base of the collector is supported on a horizontal reaction surface.

16. The precipitation collector as claimed in 12;
wherein the precipitation containment compartment is positioned to receive precipitation through the container opening.

17. A kit for assembling a precipitation collector, comprising:
a container including a container space, wherein the container space includes a precipitation containment compartment space provided in a precipitation containment compartment and an overflow compartment space provided in an overflow containment compartment, wherein the precipitation containment compartment is configured to receive precipitation through a container opening, and wherein the overflow containment compartment space is configured for receiving an overflow of precipitation from the precipitation containment compartment, wherein the container includes a discharge outlet, and wherein the container includes an overflow outlet, or an outlet-creating portion configured for separation from the container to effect fluid communication between the container space and an overflow outlet, wherein the overflow outlet is configured for discharging an overflow of the received precipitation which has been collected within the container space, wherein either:
  (a.1) a selectively operable outlet for selectively discharging precipitation which has been received within the precipitation containment compartment space and is defined by a valve fluidly coupled to the discharge outlet;
  or
  (a.2) a valve is provided and configured for fluid coupling to the container to thereby co-operate with the discharge outlet such that the valve is operable to effect selective discharge, through the discharge outlet, of received precipitation which has been collected within the precipitation containment compartment space;
a lid including a lid passage which defines a collector inlet, wherein the lid is either:
  (b.1) coupled to the container and partially covering the container opening, and the collector inlet is disposed in fluid communication with the container space through the container opening such that the lid passage provides a passage for entry of environmental precipitation into the container space; or
  (b.2) positionable relative to the container to an operative position for partially covering the container opening, wherein the collector inlet is disposed in fluid communication with the container space through the container opening when the lid is disposed in the operative position such that the lid passage provides a passage for entry of environmental precipitation into the container space.

18. The kit as claimed in claim 17;
wherein the overflow fluid passage extends from the overflow containment compartment space.

19. The kit as claimed in claim 17;
wherein the overflow containment compartment space is separated from the precipitation containment compartment by a weir, and wherein the overflow of precipitation from the precipitation containment compartment is effected when the level of the precipitation within the container exceeds the height of the weir.

20. The kit as claimed in claim 19;
wherein the overflow fluid passage extends from the overflow containment compartment space through a container wall overflow fluid passage-defining portion, wherein the lowermost edge of the container wall overflow fluid passage-defining portion is disposed below the upper edge of the weir when the collector is supported on a horizontal reaction surface.

* * * * *